US006276318B1

(12) United States Patent
Yanai et al.

(10) Patent No.: US 6,276,318 B1
(45) Date of Patent: Aug. 21, 2001

(54) SOLENOID VALVE ACTUATING APPARATUS

(75) Inventors: Akihiro Yanai; Yoshinori Kadowaki, both of Toyota; Toshio Fuwa, Nagoya, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/581,012

(22) PCT Filed: Dec. 7, 1998

(86) PCT No.: PCT/JP98/05528

§ 371 Date: Jun. 7, 2000

§ 102(e) Date: Jun. 7, 2000

(87) PCT Pub. No.: WO99/30068

PCT Pub. Date: Jun. 17, 1999

(30) Foreign Application Priority Data

Dec. 8, 1997 (JP) .......... 9-337402

(51) Int. Cl.[7] .......... F16K 31/06; F01L 9/04

(52) U.S. Cl. .......... 123/90.11; 251/129.01

(58) Field of Search .......... 123/90.11; 251/129.01, 251/129.1, 129.15, 129.16

(56) References Cited

U.S. PATENT DOCUMENTS 3,794,002 * 2/1974 Wessel .......... 123/90.11
4,706,619 * 11/1987 Buchl .......... 123/90.11
4,972,810 * 11/1990 Kawamura .......... 123/90.11
5,124,598 * 6/1992 Kawamura .......... 310/30

FOREIGN PATENT DOCUMENTS 63-277810 11/1988 (JP) .
63-193706 12/1988 (JP) .
1-11930 4/1989 (JP) .
8-284626 10/1996 (JP) .
9-189209 7/1997 (JP) .
9-217613 8/1997 (JP) .
10-47140 2/1998 (JP) .

* cited by examiner

*Primary Examiner*—Weilun Lo
(74) *Attorney, Agent, or Firm*—Kenyon & Kenyon

(57) ABSTRACT

A solenoid valve actuating apparatus wherein an actuating circuit for controlling exciting currents to electromagnets for actuating a plurality of engine valves so that the engine valves will be opened and closed can be formed by a small number of switching means is provided. Two of the engine valves form one engine valve group, and the actuating circuit is provided for each of the engine valve groups. The actuating circuit includes three series circuits each having three switching means connected in series between a first line terminal on a high voltage side and a second line terminal on a low voltage side. Four of the electromagnets each corresponding to each of the engine valve groups connect connecting-in-series portions between the switching means between different series circuits.

11 Claims, 14 Drawing Sheets

SOLENOID VALVE ACTUATING APPARATUS

TECHNICAL FIELD

The present invention relates to a solenoid valve actuating apparatus, and more particularly, to a solenoid valve actuating apparatus suitable for actuating a plurality of valves operating in synchronism with each other such as, for example, a plurality of intake valves or exhaust valves provided for each cylinder of an internal combustion engine, or the like.

BACKGROUND ART

Conventionally, for example as disclosed in Japanese Laid-Open Patent Application 8-284626, a solenoid valve for use as an intake or exhaust valve of an internal combustion engine is known. This solenoid valve is provided with an armature moving with an engine valve as a unity, a pair of solenoid coils disposed above and below the armature, and springs pushing the engine valve toward a neutral position.

When neither of the solenoid coils is supplied with an exciting current, the engine valve and the armature are held in the neutral position. Further, when an upper solenoid coil is supplied with the exciting current, the engine valve and the armature are attracted to the upper solenoid coil, while the engine valve and the armature are attracted to a lower solenoid coil when the lower solenoid coil is supplied with the exciting current. Therefore, according to the above described conventional solenoid valve, the engine valve can be operated so as to be opened and closed by alternately supplying the solenoid coils with proper exciting currents. In this case, ends of movement on closing and opening sides of the engine valve are controlled by the adhesion of the armature to the solenoid coils. Therefore, if electromagnetic forces generated by the solenoid coils can be made to promptly vanish in positions near the ends of movement of the engine valve, an excellent operational responsiveness of the solenoid valve can be realized, and the control of an impact sound and the improvement in durability are made possible because impact forces exerted between the armature and the solenoid coils are reduced.

For this purpose, the exciting currents supplied to the solenoid coils are controlled by a bridged-H-type circuit in the above described conventional solenoid valve. This bridged-H-type circuit includes a total of four switching means disposed respectively between terminals of the solenoid coil, and cathode and anode sides of a power supply. According to the bridged-H circuit, the solenoid coil can be energized in a predetermined direction by setting one pair of the switching means which are disposed diagonally across the solenoid coil to an ON state and the other pair to an OFF state. Further, the solenoid coil can be energized in the reverse direction by reversing the above described ON and OFF states. Therefore, the electromagnetic force generated by the solenoid coil can be made to promptly vanish by energizing the solenoid coil in the reverse direction to the exciting current by switching the ON and OFF states of the switching means of the bridged-H-type circuit when the engine valve approaches the end of movement.

However, as described above, the above described conventional solenoid valve requires four switching means for each of the solenoid coils. That is, eight switching means will be required for one solenoid valve as one solenoid valve is provided with two solenoid coils. Therefore, when the above described conventional solenoid valve is applied to an engine of a four-cylinder-four-valve type, for example, one hundred and twenty-eight switching means will be required, thus causing the cost of an actuating apparatus for actuating the solenoid valves to rise.

DISCLOSURE OF THE INVENTION

It is an object of the present invention to reduce a number of switching means required to control an exciting current to a solenoid coil to actuate an engine valve.

The above object is achieved by a solenoid valve actuating apparatus for actuating a plurality of engine valves, for each of which provided are a first electromagnet to actuate the engine valve in a first predetermined direction and a second electromagnet to actuate the engine valve in a second predetermined direction, by means of the first and the second electromagnets so that a plurality of the engine valves will be opened and closed, the solenoid valve actuating apparatus wherein:

two of the engine valves form one engine valve group and an actuating circuit is provided for each of the engine valve groups;

the actuating circuit includes three series circuits each having three switching means connected in series between a first line terminal on a high voltage side and a second line terminal on a low voltage side; and four of the electromagnets corresponding to each of the engine valve groups connect connecting-in-series portions between the switching means between different series circuits.

In the present invention, each of the engine valves is actuated by the first and the second electromagnets in the first and the second predetermined directions, respectively. Two of the engine valves form one engine valve group and the actuating circuit is provided for each of the engine valve groups. The actuating circuit includes the three series circuits each having the three switching means connected in series. Therefore, the exciting currents to the four electromagnets corresponding to the two engine valves can be controlled by nine of the switching means. The four electromagnets are connected between the different series circuits. Therefore, each of the electromagnets can be supplied with the exciting currents in both directions by the combinations of ON and OFF states of the switching means of each of the series circuits, and electromagnetic forces exerted on the engine valve can be made to promptly vanish by enabling currents flowing through the electromagnets to flow into the first line terminal.

In this case, the actuating circuit may include a first through third series circuits having a first through third switching means connected in series in order from the first line terminal side between the first line terminal and the second line terminal, and the four electromagnets may be connected between a connecting portion of the first and the second switching means of the first series circuit and a connecting portion of the first and the second switching means of the second series circuit, between a connecting portion of the second and the third switching means of the first series circuit and a connecting portion of the second and the third switching means of the second series circuit, between the connecting portion of the first and the second switching means of the second series circuit and a connecting portion of the first and the second switching means of the third series circuit, and between the connecting portion of the second and the third switching means of the second series circuit and a connecting portion of the second and the third switching means of the third series circuit, respectively.

In the present invention, the actuating circuit includes the first through third series circuits wherein the first through third switching means are connected in series between the first line terminal and the second line terminal. The four electromagnets are connected between the series circuits. For example, a state wherein the exciting current is supplied from the second series circuit side in a direction toward the first series circuit side (hereinafter referred to as a first direction) is formed of the electromagnet connected between the connecting portion of the first and the second switching means of the first series circuit and the connecting portion of the first and the second switching means of the second series circuit by setting to the ON state the first switching means of the second series circuit, and the second and the third switching means of the first series circuit. Further, a state wherein the exciting current flowing in the first direction flows into the first line terminal or the exciting current is supplied in the reverse direction to the first direction is formed by setting to the ON state the first switching means of the first series circuit, and the second and the third switching means of the second series circuit. The same states are formed of the other electromagnets by the combinations of the ON and the OFF states of the switching means.

Further, the first electromagnet corresponding to one engine valve of each of the engine valve groups may be connected between the connecting portion of the first and the second switching means of the first series circuit and the connecting portion of the first and the second switching means of the second series circuit, the second electromagnet corresponding to the one engine valve may be connected between the connecting portion of the second and the third switching means of the first series circuit and the connecting portion of the second and the third switching means of the second series circuit, the first electromagnet corresponding to another engine valve may be connected between the connecting portion of the second and the third switching means of the second series circuit and the connecting portion of the second and the third switching means of the third series circuit, and the second electromagnet corresponding to the other engine valve may be connected between the connecting portion of the first and the second switching means of the second series circuit and the connecting portion of the first and the second switching means of the third series circuit.

In the present invention, the first electromagnet corresponding to the one engine valve of each of the engine valve groups (hereinafter referred to as a first engine valve) is connected between the connecting portion of the first and the second switching means of the first series circuit and the connecting portion of the first and the second switching means of the second series circuit. Further, the second electromagnet corresponding to the first engine valve is connected between the connecting portion of the second and the third switching means of the first series circuit and the connecting portion of the second and the third switching means of the second series circuit. On the other hand, the first electromagnet corresponding to the other engine valve (hereinafter referred to as a second engine valve) is connected between the connecting portion of the second and the third switching means of the second series circuit and the connecting portion of the second and the third switching means of the third series circuit. Further, the second electromagnet corresponding to the second engine valve is connected between the connecting portion of the first and the second switching means of the second series circuit and the connecting portion of the first and the second switching means of the third series circuit.

When the first and the second switching means of the first series circuit, the first and the third switching means of the second series circuit, and the second and the third switching means of the third series circuit are set to the ON state, a state wherein the second electromagnet of the first engine valve is supplied with the exciting current from the first series circuit side in a direction toward the second series circuit side, and the second electromagnet of the second engine valve is supplied with the exciting current from the second series circuit side in a direction toward the third series circuit side is formed. Further, when the second and the third switching means of the first series circuit, the first and the third switching means of the second series circuit, and the first and the second switching means of the third series circuit are set to the ON state, a state wherein the first electromagnet of the first engine valve is supplied with the exciting current from the second series circuit side in a direction toward the first series circuit side, and the first electromagnet of the second engine valve is supplied with the exciting current from the third series circuit side in the direction toward the second series circuit side is formed. Hereinafter, a direction of the exciting currents supplied to the electromagnets in these two states are referred to as a positive direction and a direction reverse to this is referred to as a reverse direction. Further, a state wherein an electromagnet is supplied with an exciting current in the positive direction is referred to as a powered state.

On the other hand, when the third switching means of the first series circuit, the second switching means of the second series circuit and the first switching means of the third series circuit are set to the ON state, a state wherein the exciting currents in the positive direction flowing through the second electromagnet of the first engine valve and the second electromagnet of the second engine valve flow into the first line terminal side, or these two electromagnets are supplied with the exciting currents in the reverse direction is formed. Hereinafter, a state wherein an exciting current in the positive direction flowing through an electromagnet flows into the first line terminal side or the electromagnet is supplied with the exciting current in the reverse direction is referred to as a regenerative/reverse current state of the electromagnet. Further, when the first switching means of the first series circuit, the second switching means of the second series circuit and the third switching means of the third series circuit are set to the ON state, a state wherein the first electromagnet of the first engine valve and the first electromagnet of the second engine valve are set to the regenerative/reverse current state is formed.

When the first and the second switching means of the first series circuit and the third switching means of the second series circuit are set to the ON state, a state wherein the second electromagnet of the first engine valve is set to the powered state is formed. Further, when the first switching means of the second series circuit and the second and the third switching means of the third series circuit are set to the ON state, a state wherein the second electromagnet of the second engine valve is set to the powered state is formed.

When the third switching means of the second series circuit and the first and the second switching means of the third series circuit are set to the ON state, a state wherein the first electromagnet of the second engine valve is set to the powered state is formed. Further, when the second and the third switching means of the first series circuit and the first switching means of the second series circuit are set to the ON state, a state wherein the first electromagnet of the first engine valve is set to the powered state is formed.

When the third switching means of the first series circuit and the first and the second switching means of the second series circuit are set to the ON state, a state wherein the second electromagnet of the first engine valve is set to the regenerative/reverse current state is formed. Further, when the second and the third switching means of the second series circuit and the first switching means of the third series circuit are set to the ON state, a state wherein the second electromagnet of the second engine valve is set to the regenerative/reverse current state is formed.

When the second and the third switching means of the first series circuit, the first switching means of the second series circuit and the second and the third switching means of the third series circuit are set to the ON state, a state wherein the first electromagnet of the first engine valve and the second electromagnet of the second engine valve are set to the powered state is formed. Further, when the first and the second switching means of the first series circuit, the third switching means of the second series circuit and the first and the second switching means of the third series circuit are set to the ON state, a state wherein the first electromagnet of the second engine valve and the second electromagnet of the first engine valve are set to the powered state is formed.

When the first switching means of the first series circuit and the second and the third switching means of the second series circuit are set to the ON state, a state wherein the first electromagnet of the first engine valve is set to the regenerative/reverse current state is formed. Further, when the first and the second switching means of the second series circuit and the third switching means of the third series circuit are set to the ON state, a state wherein the first electromagnet of the second engine valve is set to the regenerative/reverse current state is formed.

Thus, according to the present invention, by means of the nine switching means, the first or the second electromagnet of both or one of the first and the second engine valves can be set to the powered state or to the regenerative/reverse current state depending on the combinations of the ON and the OFF states of each of the nine switching means. In the regenerative/reverse current state, the electromagnetic forces generated by the electromagnets are made to promptly vanish because the exciting currents flowing through the electromagnets are promptly reduced, and further, the exciting currents are supplied in the reverse direction. Therefore, by properly realizing the powered state and the regenerative/reverse current state of each of the electromagnets in accordance with the operation of the engine valve, the electromagnetic forces exerted on the engine valve can be made to promptly vanish at a required timing after the engine valve is actuated.

The above object is further achieved by a solenoid valve actuating apparatus for actuating a plurality of engine valves, for each of which provided are a first electromagnet to actuate the engine valve in a first predetermined direction and a second electromagnet to actuate the engine valve in a second predetermined direction, by means of the first and the second electromagnets so that a plurality of the engine valves will be opened and closed, the solenoid valve actuating apparatus wherein:

two of the engine valves form one engine valve group and an actuating circuit is provided for each of the engine valve groups;

the actuating circuit includes:

a first and a second series circuits each having three switching means connected in series between a first line terminal on a high voltage side and a second line terminal on a low voltage side; and a third series circuit wherein two of the switching means and one diode disposed so as to allow a current flow from the second line terminal side to the first terminal side are connected in series between the first line terminal and the second line terminal so that the diode will be disposed in a center; and four of the electromagnets corresponding to each of the engine valve groups are connected between connecting portions of the switching means and the diode of the third series circuit and connecting portions between the switching means of the first or the second series circuit.

In the present invention, two of the engine valves belonging to each of the engine valve groups are actuated by a total of four of the electromagnets. The actuating circuit is provided with the first and the second series circuits having the three switching means connected in series, and with the third series circuit having the diode to allow a current to flow from the low voltage side to the high voltage side connected in series between the two switching means. Therefore, the exciting currents to the four electromagnets can be controlled by the eight switching means and the one diode. Each of the four electromagnets is connected between the third series circuit and the first or the second series circuit. Therefore, the electromagnets can be supplied with the exciting currents in a predetermined direction by the combinations of the ON and the OFF states of the switching means of the series circuits, and the electromagnetic forces exerted on the engine valve can be made to promptly vanish by having the exciting currents flowing through the electromagnets flow into the first line terminal side.

In this case, the actuating circuit may include the first and the second series circuits each having a first through third switching means connected in series in order from the first line terminal side between the first line terminal and the second line terminal, and the third series circuit having a first switching means, the diode provided so as to allow the current flow from the second line terminal side to the first terminal side and a second switching means connected in series in order from the first line terminal side between the first line terminal and the second line terminal, and the four electromagnets may be connected between a connecting portion of the first and the second switching means of the first series circuit and a connecting portion of the first switching means and the diode of the third series circuit, between a connecting portion of the second and the third switching means of the first series circuit and a connecting portion of the diode and the second switching means of the third series circuit, between a connecting portion of the first and the second switching means of the second series circuit and the connecting portion of the first switching means and the diode of the third series circuit, and between a connecting portion of the second and the third switching means of the second series circuit and the connecting portion of the diode and the second switching means of the third series circuit, respectively.

In the present invention, two of the engine valves belonging to each of the engine valve groups are actuated by a total of four of the electromagnets. The actuating circuit is provided with the first and the second series circuits having the first through third switching means connected in series between the first line terminal and the second line terminal, and with the third series circuit having the first switching means, the diode provided so as to allow the current flow from the second line terminal side to the first terminal side and a second switching means connected in series from the first line terminal side to the second line terminal side. That is, eight of the switching means and the one diode are provided for the four electromagnets. The four electromagnets are connected between the first or the second series circuit and the third series circuit. For example, a state wherein the exciting current is supplied in the first direction from the third series circuit side to the first series circuit side is formed of the electromagnet connected between the connecting portion of the first and the second switching means of the first series circuit and the connecting portion of the first switching means and the diode of the third series circuit by setting to the ON state the first switching means of the third series circuit, and the second and the third switching means of the first series circuit. Further, a state wherein the exciting current flowing in the first direction flows into the first line terminal is formed by setting to the ON state the first switching means of the first series circuit and the second switching means of the third series circuit. The same states are formed of the other electromagnets by the combinations of the ON and the OFF states of the switching means.

Further, the first electromagnet corresponding to one engine valve of each of the engine valve groups may be connected between the connecting portion of the first and the second switching means of the first series circuit and the connecting portion of the first switching means and the diode of the third series circuit, the second electromagnet corresponding to the one engine valve may be connected between the connecting portion of the second and the third switching means of the first series circuit and the connecting portion of the second switching means and the diode of the third series circuit, the first electromagnet corresponding to another engine valve may be connected between the connecting portion of the second and the third switching means of the second series circuit and the connecting portion of the second switching means and the diode of the third series circuit, and the second electromagnet corresponding to the other engine valve may be connected between the connecting portion of the first and the second switching means of the second series circuit and the connecting portion of the first switching means and the diode of the third series circuit.

In the present invention, the first electromagnet corresponding to the one engine valve of each of the engine valve groups (hereinafter referred to as a first engine valve) is connected between the connecting portion of the first and the second switching means of the first series circuit and the connecting portion of the first switching means and the diode of the third series circuit. Further, the second electromagnet corresponding to the one engine valve is connected between the connecting portion of the second and the third switching means of the first series circuit and the connecting portion of the second switching means and the diode of the third series circuit. The first electromagnet corresponding to the other engine valve (hereinafter referred to as a second engine valve) is connected between the connecting portion of the second and the third switching means of the second series circuit and the connecting portion of the second switching means and the diode of the third series circuit. Further, the second electromagnet corresponding to the other engine valve is connected between the connecting portion of the first and the second switching means of the second series circuit and the connecting portion of the first switching means and the diode of the third series circuit.

When the first and the second switching means of the first series circuit, the second and the third switching means of the second series circuit and the first and the second switching means of the third series circuit are set to the ON state, a state wherein the second electromagnet of the first engine valve is supplied with the exciting current from the first series circuit side in a direction toward the third series circuit side, and the second electromagnet of the second engine valve is supplied with the exciting current from the third series circuit side in a direction toward the second series circuit side is formed. Further, when the second and the third switching means of the first series circuit, the first and the second switching means of the second series circuit, and the first and the second switching means of the third series circuit are set to the ON state, a state wherein the first electromagnet of the first engine valve is supplied with the exciting current from the third series circuit side in a direction toward the first series circuit side and the first electromagnet of the second engine valve is supplied with the exciting current from the second series circuit side in the direction toward the third series circuit side is formed. Hereinafter, a direction of the exciting currents supplied to the electromagnets in these two states are referred to as a positive direction, and a direction reverse to this is referred to as a reverse direction. Further, a state wherein an electromagnet is supplied with an exciting current in the positive direction is referred to as a powered state.

On the other hand, when the third switching means of the first series circuit and the first switching means of the second series circuit are set to the ON state, a state wherein the exciting currents in the positive direction flowing through the second electromagnet of the first engine valve and the second electromagnet of the second engine valve flow into the first line terminal side is formed. Hereinafter, a state wherein an exciting current in the positive direction flowing through an electromagnet flows into the first line terminal side is referred to as a regenerative state of the electromagnet. Further, when the first switching means of the first series circuit and the third switching means of the second series circuit are set to the ON state, a state wherein the first electromagnet of the first engine valve and the first electromagnet of the second engine valve are set to the regenerative state is formed.

When the first and the second switching means of the first series circuit and the second switching means of the third series circuit are set to the ON state, a state wherein the second electromagnet of the first engine valve is set to the powered state is formed. Further, when the second and the third switching means of the second series circuit and the first switching means of the third series circuit are set to the ON state, a state wherein the second electromagnet of the second engine valve is set to the powered state is formed.

When the first and the second switching means of the second series circuit and the second switching means of the third series circuit are set to the ON state, a state wherein the first electromagnet of the second engine valve is set to the powered state is formed. Further, when the second and the third switching means of the first series circuit and the first switching means of the third series circuit are set to the ON state, a state wherein the first electromagnet of the first engine valve is set to the powered state is formed.

When the third switching means of the first series circuit and the first switching means of the second series circuit are set to the ON state, a state wherein the second electromagnet of the first engine valve is set to the regenerative state is formed. Further, the first switching means of the second series circuit and the second switching means of the third series circuit are set to the ON state, a state wherein the second electromagnet of the second series circuit is set to the regenerative state is formed.

When the second and the third switching means of the first series circuit, the second and the third switching means of the second series circuit and the first switching means of the third series circuit are set to the ON state, a state wherein the first electromagnet of the first engine valve and the second electromagnet of the second engine valve are set to the powered state is formed. Further, when the first and the second switching means of the first series circuit, the first and the second switching means of the second series circuit and the second switching means of the third series circuit are set to the ON state, a state wherein the first electromagnet of the second engine valve and the second electromagnet of the first engine valve are set to the powered state is formed.

When the first switching means of the first series circuit and the second switching means of the third series circuit are set to the ON state, a state wherein the first electromagnet of the first engine valve is set to the regenerative state is formed. Further, when the third switching means of the second series circuit and the first switching means of the third series circuit are set to the ON state, a state wherein the first electromagnet of the second engine valve is set to the regenerative/reverse current state is formed.

Thus, according to the present invention, by means of the eight switching means and the one diode, the first or the second electromagnet of both or one of the first and the second engine valves can be set to the powered state or to the regenerative state depending on the combinations of the ON and the OFF states of the switching means. In the regenerative state, the electromagnetic forces generated by the electromagnets are made to promptly vanish by the prompt reduction of the exciting currents flowing through the electromagnets. Therefore, by properly realizing the powered state and the regenerative state of each of the electromagnets in accordance with the operation of the engine valve, the electromagnetic forces exerted on the engine valve can be made to promptly vanish at a required timing after the engine valve is actuated.

Each of the switching means may include a switching element turning on and off and a diode disposed in parallel with the switching element so as to allow a current to flow from the second line terminal side to the first line terminal side.

In the present invention, each of the switching means includes the switching element turning on and off and the diode disposed in parallel with the switching element so as to allow the current to flow from the second line terminal side to the first line terminal side. Therefore, each of the switching means allows the current to flow from the second line terminal side to the first line terminal side even if each of the switching means is set to the OFF state. Thus, when an exciting current to an electromagnet is cut off, a flywheel current can flow through the electromagnet by setting the ON and the OFF states of the switching means so that a closed circuit including the diodes which the switching means have and the solenoid coils will be made.

Further, each of the electromagnets may be supplied with the exciting current having a predetermined wave form by switching the combinations of the ON and the OFF states of the switching means.

In the present invention, each of the electromagnets is supplied with the exciting current having the predetermined wave form by switching the combinations of the ON and the OFF states of the switching means. Therefore, according to the present invention, the wave forms of the exciting currents supplied to the electromagnets can be controlled while the number of the switching means are reduced.

In this case, the predetermined wave form may include a wave form portion of a positive current in a predetermined positive direction and a wave form portion of a reverse current in the reverse direction to the positive direction.

In the present invention, when the electromagnet is supplied with the exciting current in the positive direction, the engine valve is actuated by the electromagnet. On the other hand, when the electromagnet is supplied with the exciting current in the reverse direction after the engine valve is actuated, the electromagnetic force generated by the electromagnet is made to promptly vanish. Therefore, bacause the wave form of the exciting current supplied to the electromagnet includes the wave form portion of the positive current and the wave form portion of the reverse current, the electromagnetic force generated by the electromagnet can be made to promptly vanish at a required timing after the electromagnetic force actuates the engine valve.

BEST MODE FOR CARRYING OUT THE INVENTION

Figure 1:
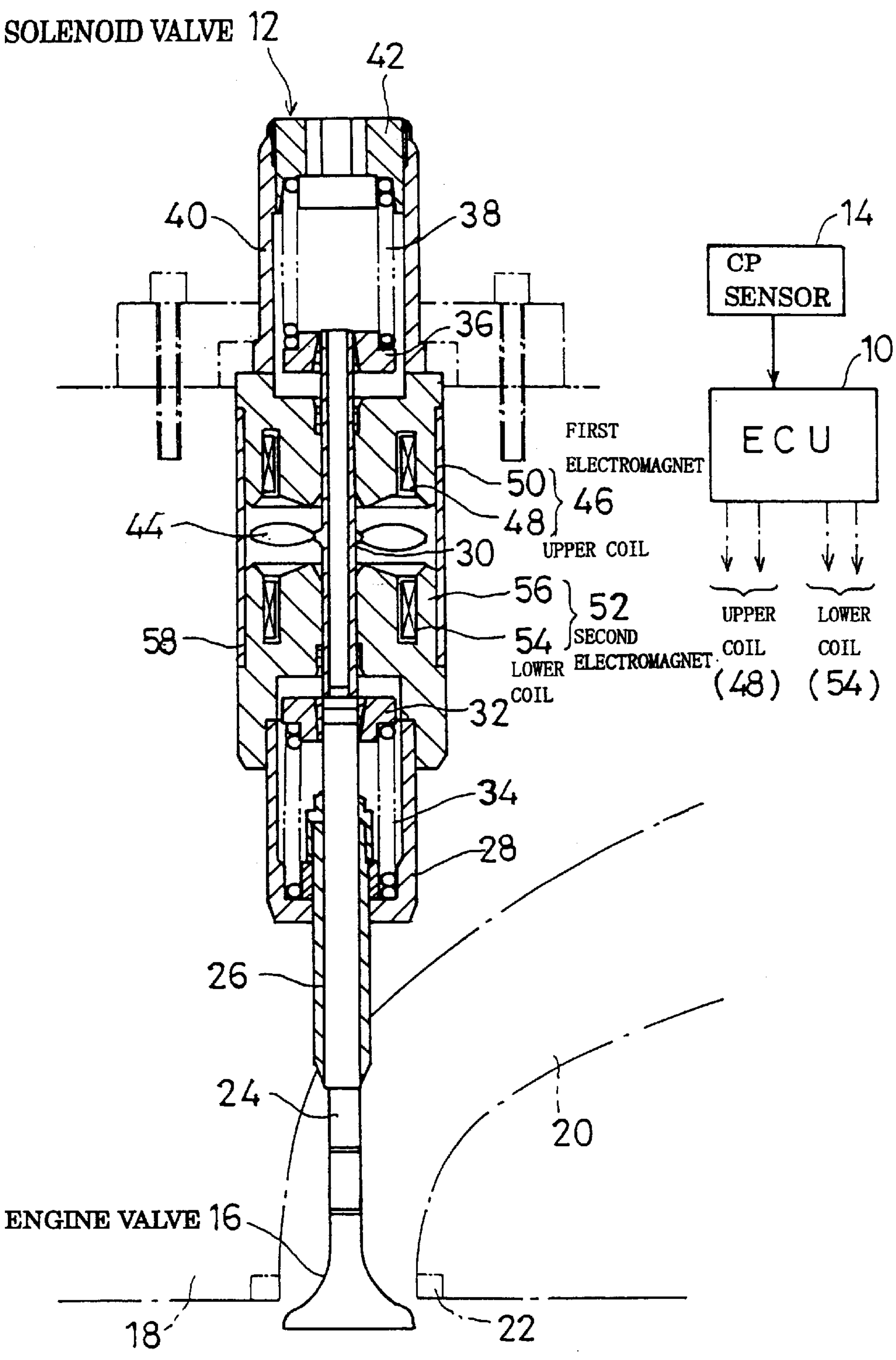
FIG. 1 is a diagram of a system structure of a solenoid valve actuating apparatus according to an embodiment of the present invention.

FIG. 1 is a diagram of a system structure of a solenoid valve actuating apparatus according to an embodiment of the present invention. The solenoid valve actuating apparatus of the present embodiment is provided with an electronic control unit (hereinafter referred to as an ECU) 10 and a solenoid valve 12. A crank position sensor (hereinafter referred to as a CP sensor) is connected to the ECU 10.

The CP sensor 14 is a sensor which outputs a basic signal and a crank angle signal. The basic signal is output every time a crank angle of an internal combustion engine corresponds with a predetermined basic angle. The ECU 10 detects the crank angle of the internal combustion engine in accordance with the output signal of the CP sensor, and controls the solenoid valve 12 in accordance with the result of the detection.

The solenoid valve 12 has an engine valve 16. In the present embodiment, the solenoid valve 12 is applied to the internal combustion engine of a four-cylinder-four-valve type. That is, each of cylinders of the internal combustion engine is provided with four of the solenoid valves 12, and the engine valves 16 of two of the four solenoid valves 12 form intake valves and the engine valves 16 of the other two solenoid valves 12 form exhaust valves.

The engine valve 16 is disposed in a cylinder head 18 so as to be exposed in a combustion chamber of the internal combustion engine. An intake port (or an exhaust port) 20 is formed in the cylinder head 18. The intake port (or the exhaust port) 20 is provided with a valve seat 22 for the engine valve 16. The intake port (or the exhaust port) 20 communicates with the combustion chamber when the engine valve 16 is seated on the valve seat 22, and the intake port (or the exhaust port) 20 is disconnected from the combustion chamber when the engine valve 16 is seated on the valve seat 22.

A valve shaft 24 is fixed to the engine valve 16. The valve shaft 24 is held by a valve guide 26 so as to be able to slide in an axial direction. The valve guide 26 is supported by the cylinder head 18, and a lower cap 28 of the solenoid valve 12 is fixed to the valve guide 26.

An armature shaft 30, which is made of a non-magnetic member, is disposed on top of the valve shaft 24. A lower retainer 32 is fixed on an upper end portion of the valve shaft 24. A lower spring 34 is disposed between the lower retainer 32 and the lower cap 28. The lower spring 34 exerts a resilient force so as to push the lower retainer 32, namely, the armature shaft 30 and the engine valve 16 in an upward direction in FIG. 1.

An upper retainer 36 is fixed on an upper end portion of the armature shaft 30. An upper spring 38 is disposed on top of the upper retainer 36. The upper spring 38 exerts a resilient force so as to push the upper retainer 36, namely, the armature shaft 30 and the engine valve 16 in a downward direction in FIG. 1.

A cylindrical upper cap 40 is disposed around the upper spring 38. An adjuster bolt 42 is disposed on an upper end portion of the upper cap 40. An upper end of the upper spring 38 remains in contact with the adjuster bolt 42.

An armature 44 is joined to the armature shaft 30. The armature 44 is an annular member which is made of a magnetic material. A first electromagnet 46 is disposed above the armature 44. The first electromagnet 46 is provided with an upper coil 48 and an upper core 50. A second electromagnet 52 is disposed below the armature 44. The second electromagnet 52 is provided with a lower coil 54 and a lower core 56.

The upper coil 48 and the lower coil 54 are connected to the ECU 10. Exciting currents are supplied to the upper coil 48 and the lower coil 54 from the ECU 10. The upper core 50 and the lower core 56 are members made of a magnetic material, in center portions of which the armature shaft 30 is held in a slidable way. The first electromagnet 46 and the second electromagnet 52 are held by an outer cylinder 58 so that a predetermined distance is kept between the first electromagnet 46 and the second electromagnet 52. A neutral position of the armature 44 is so adjusted by the adjuster bolt 42 as to correspond to a middle point between the first electromagnet 46 and the second electromagnet 52.

A description will now be given of an operation of the solenoid valve 12.

In the solenoid valve 12, the upper coil 48 can generate magnetic flux with the exciting current being supplied thereto. The magnetic flux generated by the upper coil 48 goes through a path which includes the upper core 50 and the armature 44. At this point, an electromagnetic force in a direction to attract the armature 44 to the first electromagnet 46 is generated between the armature 44 and the first electromagnet 46.

Thus, according to the solenoid valve 12, the armature 44, the armature shaft 30, the engine valve 16 and so on can be moved to the side of the first electromagnet 46 by supplying the upper coil 48 with a proper exciting current. The armature shaft 30 can be moved to the side of the first electromagnet 46 until the armature 44 comes in contact with the upper core 50. The engine valve 16 closes the intake port (or the exhaust port) 20 under conditions wherein the armature 44 remains in contact with the upper core 50. Therefore, according to the solenoid valve 12, the engine valve 16 can be set to a fully closed state by supplying the upper coil 48 with the proper exciting current.

When the engine valve 16 is maintained in the fully closed state, the upper spring 38 and the lower spring 34 push the armature shaft 30 toward a neutral position. When the exciting current to the upper coil 48 is cut off under these conditions, the armature shaft 30 starts a simple harmonic motion in accordance with the resilient forces of the upper spring 38 and the lower spring 34.

According to the solenoid valve 12, the lower coil 54 can generate magnetic flux with the exciting current being supplied thereto. The magnetic flux generated by the lower coil 54 goes through a path which includes the lower core 56 and the armature 44. At this point, an electromagnetic force in a direction to attract the armature 44 to the second electromagnet 52 is generated between the armature 44 and the second electromagnet 52. Thus, according to the solenoid valve 12, the armature shaft 30 can be moved until the armature 44 comes in contact with the second electromagnet 52 by supplying the lower coil 54 with a proper exciting current to compensate for a loss of energy caused by a sliding motion of the armature shaft 30.

The engine valve 16 is set to a fully opened state when the armature 44 comes in contact with the second electromagnet 52. Therefore, according to the solenoid valve 12, the engine valve 16 can be moved from the fully closed state to the fully opened state by starting the supply of the exciting current to the lower coil 54 at a predetermined timing after the exciting current to the upper coil 48 is cut off.

When the exciting current to the lower coil 54 is cut off after the engine valve 16 reaches the fully opened state, the engine valve 16 starts to move toward the fully closed position in accordance with the simple harmonic motion. Thereafter, an opening and closing operation of the engine valve 16 can be performed by repeating the timely supply of the exciting currents to the upper coil 48 and the lower coil 54.

In the opening and closing operation of the engine valve 16, if an electromagnetic attracting force exerted between the armature 44 and the first electromagnet 46 or the second electromagnet 52 can be made zero when the armature 44 comes in contact with the first electromagnet 46 or the second electromagnet 52, an impact force exerted between the armature 44 and the first electromagnet 46 or the second electromagnet 52 can be reduced to prevent a generation of an impact sound, and also the durability of the solenoid valve 12 can be improved. Further, in this case, an excellent responsiveness of the solenoid valve 12 can be realized because the armature 44 can quickly be released from the first electromagnet 46 or the second electromagnet 52. From this point of view, it is desirable to make the electromagnetic attracting force exerted between the armature 44 and the first electromagnet 46 or the second electromagnet 52 vanish promptly at a desired timing.

However, for example, a current in the same direction as the exciting current supplied to the upper coil 48 continues to flow through the upper coil 48 for a certain period of time because of a counterelectromotive force generated in the upper coil 48 even after the exciting current to the upper coil 48 is cut off. Further, the electromagnetic attracting force is exerted between the armature 44 and the first electromagnet 46 for a certain period of time because of overcurrents generated in the armature 44 and the upper core 50 even when the current flowing through the upper coil 48 is reduced to zero. Therefore, it is necessary to make the current generated by the counterelectromotive force of the upper coil 48 and further the overcurrents generated in the armature 44 and the upper core 50 vanish promptly in order to make the electromagnetic attracting force exerted between the armature 44 and the first electromagnet 46 vanish promptly.

From this point of view, it is effective to supply the upper coil 48 with the exciting current in the reverse direction for a predetermined period of time after the exciting current to the upper coil 48 is cut off. Similarly, it is effective to supply the lower coil 54 with the exciting current in the reverse direction for a predetermined period of time after the exciting current to the lower coil 54 is cut off in order to make the electromagnetic attracting force exerted between the armature 44 and the second electromagnet 52 vanish promptly. That is, an overcurrent can be offset by supplying a coil with a current in the reverse direction, which can make an electromagnetic attracting force vanish promptly.

Figure 2:
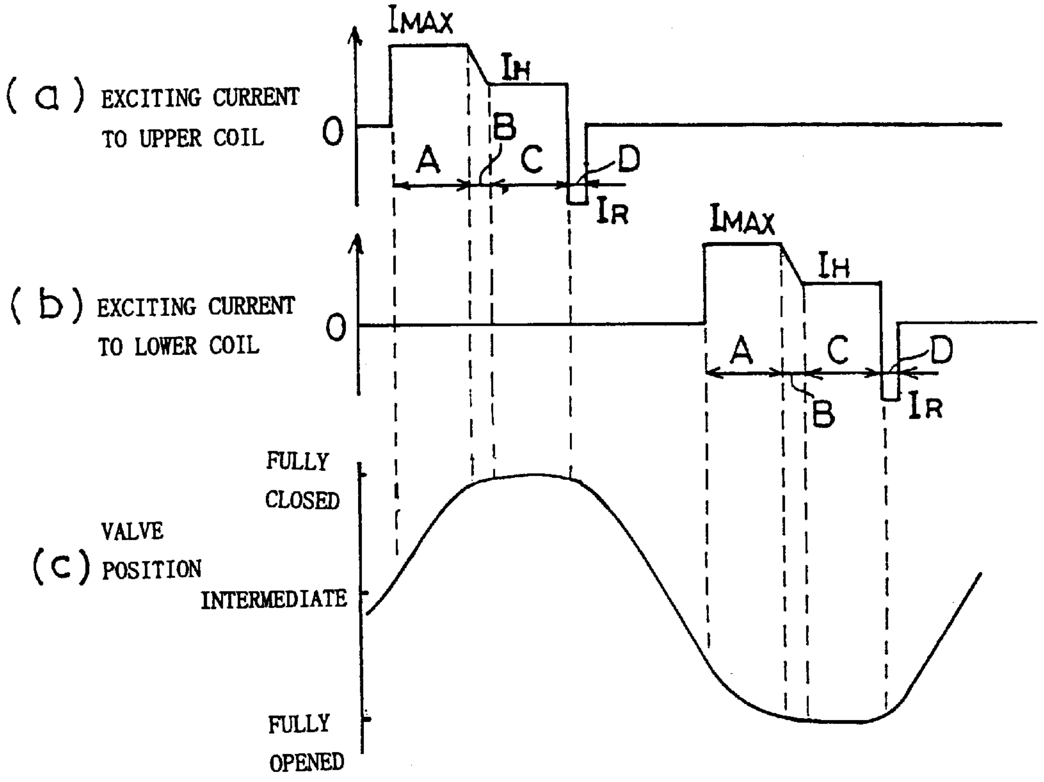
FIG. 2 shows wave forms of exciting currents supplied to an upper coil and a lower coil when both of two solenoid valves are actuated so as to be opened and closed in the present embodiment, and operations of the solenoid valve corresponding to the wave forms.

FIG. 2 shows wave forms of the exciting currents employed in the solenoid valve 12 from the above mentioned viewpoint (FIG. 2(*a*) and (*b*)), and a pattern of changes in position of the engine valve 16 which is obtained from the wave forms (FIG. 2(*c*)).

As shown in FIG. 2(*a*), during an attraction period wherein the engine valve 16 is moved from the fully opened position to the fully closed position (Periods A and B shown in FIG. 2(*a*)), the exciting current supplied to the upper coil 48 is controlled to a maximum exciting current $I_{MAX}$ only for a predetermined period (Period A shown in FIG. 2(*a*)), and then is so controlled, after a transition period (Period B shown in FIG. 2(*a*)), as to correspond to the above mentioned holding current $I_H$ (Period C shown in FIG. 2(*a*)) almost at the same time that the engine valve 16 reaches the fully closed position. Further, this exciting current is controlled to a demagnetizing current $I_R$ flowing in the reverse direction to the maximum exciting current $I_{MAX}$ when a demand to close the engine valve 16 in the fully opened position is made (Period D shown in FIG. 2(*a*)).

In the same way as described above, as shown in FIG. 2(*b*), during an attraction period wherein the engine valve 16 is moved from the fully closed position to the fully opened position (Periods A and B shown in FIG. 2(*b*)), the exciting current supplied to the lower coil 54 is maintained at the predetermined value $I_{MAX}$ only for a predetermined period (Period A shown in FIG. 2(*b*)), and then is so controlled as to be reduced toward the predetermined holding current $I_H$ (Period C shown in FIG. 2(*b*)) after a transition period (Period B shown in FIG. 2(*b*)). Further, this exciting current is controlled to the demagnetizing current $I_R$ flowing in the reverse direction at the point that a demand to close the engine valve 16 in the fully opened position is generated (Period D shown in FIG. 2(*b*)).

Further, the opening and closing operation of the solenoid valve 12 in synchronism with the operation of the internal combustion engine can be performed by setting timings to supply the upper coil 48 and the lower coil 54 with the exciting currents in accordance with the output signals of the CP sensor 14.

As described below, the above described wave forms of the exciting currents supplied to the upper coil 48 and the lower coil 54 are realized by the ECU 10 properly switching a state wherein the exciting currents in a positive direction are supplied to the upper coil 48 and the lower coil 54 and a state wherein the exciting currents in the reverse direction are supplied to the upper coil 48 and the lower coil 54.

The solenoid valve actuating apparatus of the present embodiment is characterized in that the desired wave forms as described above can be realized by reversing the directions of the exciting currents supplied to the upper coil 48 and the lower coil 54 with a limited number of switching means provided for the ECU 10.

Figure 3:
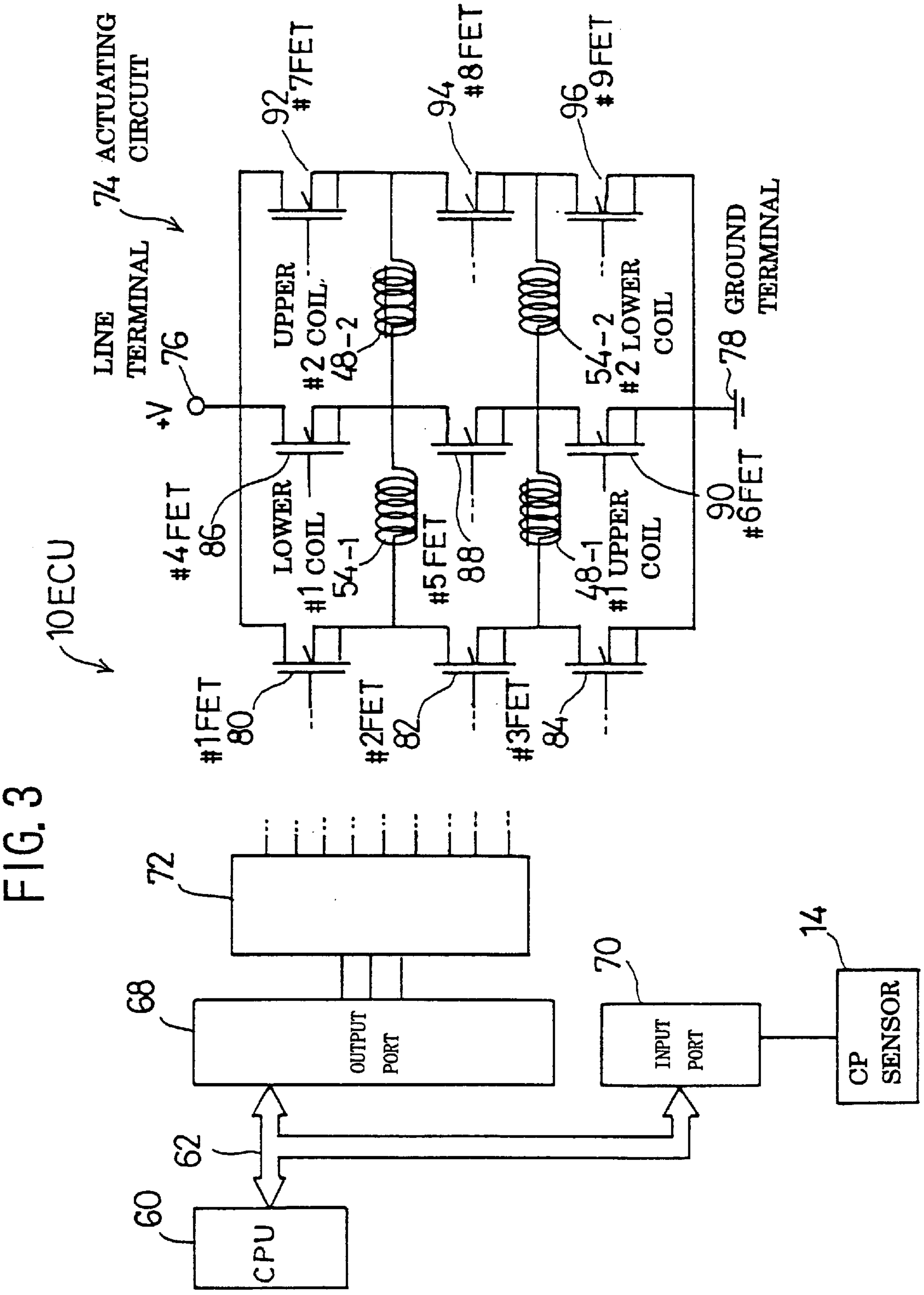
FIG. 3 is a diagram of an internal structure of an ECU provided for a solenoid valve actuating apparatus of the present embodiment.

A description will now be given of an internal structure of the ECU 10 with reference to FIG. 3. FIG. 3 is a circuit diagram showing the internal structure of the ECU 10. As shown in FIG. 3, the ECU 10 is provided with a CPU 60. An output port 68 and an input port 70 are connected to the CPU 10 through a bus line 62. The CP sensor 14 is connected to the input port 70.

The ECU 10 is also provided with a buffer circuit 72 and an actuating circuit 74. As described above, the solenoid valves 12 form the intake valves and the exhaust valves of the internal combustion engine of a four-cylinder-four-valve type. That is, each of the cylinders of the internal combustion engine is provided with a pair of the solenoid valves 12 which operate as intake valves and a pair of the solenoid valves 12 which operate as exhaust valves. In the present embodiment, a total of eight pairs of the buffer circuits 72 and the actuating circuits 74 are provided, each corresponding to each pair of the intake valves provided for the same cylinder and each pair of the intake valves provided for the same cylinder. However, FIG. 3 shows only the buffer circuit 72 and the actuating circuit 74 corresponding to a pair of the solenoid valves 12 which form, for example, the intake valves provided for one cylinder because each of the buffer circuits 72 and each of the actuating circuits 74 have the respective identical structures and operations.

The actuating circuit 74 is provided with a line terminal 76 and an ground terminal 78. A supply voltage line and a ground voltage line of the ECU 10 are connected to the line terminal 76 and the ground terminal 78, respectively. Therefore, a supply voltage V of the ECU 10 is supplied to the line terminal 76. Another new power supply than the ECU 10 may be provided. The actuating circuit 74 is also provided with nine field-effect transistors (FET) which function as switching means, namely, a #1 FET 80, a #2 FET 82, a #3 FET 84, a #4 FET 86, a #5 FET 88, a #6 FET 90, a #7 FET 92, a #8 FET 94 and a #9 FET 96.

Each of drain terminals of the #1 FET 80, the #4 FET 86 and the #7 FET 92 is connected to the line terminal 76. A lower coil 54 (hereinafter referred to as a #1 lower coil 54-1) of one solenoid valve 12 (hereinafter referred to as a #1 solenoid valve 12-1) which forms the intake valve is connected between a source terminal of the #1 FET 80 and a source terminal of the #4 FET 86. Further, an upper coil 48 (hereinafter referred to as a #2 lower coil 48-2) of the other solenoid valve 12 (hereinafter referred to as a #2 solenoid valve 12-2) which forms the intake valve is connected between the source terminal of the #4 FET 86 and the #7 FET 92.

The source terminals of the #1 FET 80, the #4 FET 86, and the #7 FET 92 are connected to drain terminals of the #2 FET 82, the #5 FET 88 and the #8 FET 94, respectively. An upper coil 48 (hereinafter referred to as a #1 upper coil 48-1) of the #1 solenoid valve 12-1 is connected between a source terminal of the #2 FET 82 and a source terminal of the #5 FET 88. Further, a lower coil 54 (hereinafter referred to as a #2 lower coil 54-2) of the #2 solenoid valve 12-2 is connected between the source terminal of the #5 FET 88 and a source terminal of the #8 FET 94.

The source terminals of the #2 FET 82, the #5 FET 88 and the #8 FET 94 are connected to drain terminals of the #3 FET 84, the #6 FET 90 and the #9 FET 96, respectively. Further, each of source terminals of the #3 FET 84, the #6 FET 90 and the #9 FET 96 is connected to the ground terminal 78.

Each of gate terminals of the #1 FET 80 through the #9 FET 96 is connected to the above described buffer circuit 72. The buffer circuit 72 supplies a high or low level actuating signal to each of the gate terminals of the #1 FET 80 through the #9 FET 96 in accordance with a command signal from the CPU 60. The #1 FET 80 through the #9 FET 96 are set to an ON state by the high level signal being supplied from the buffer circuit 72 to each of the gate terminals. Further, the #1 FET 80 through the #9 FET 96 are set to an OFF state by the low level signal being supplied from the buffer circuit 72 to each of the gate terminals.

Each of the #1 FET 80 through the #9 FET 96 includes therein an internal diode which allows a current to flow from the source terminal to the drain terminal. Therefore, each of the #1 FET 80 through the #9 FET 96 allows a current to flow from the source terminal side to the gate terminal side (that is, in an upward direction in FIG. 3) also in the OFF state.

In the solenoid valve actuating apparatus of the present embodiment, both of the two intake valves of each of the cylinders are basically opened and closed at the same timing with respect to each other. However in cases wherein the internal combustion engine is operated with a light load and a few number of revolutions, one intake valve is held in a closed state and only the other intake valve is opened and closed in the light of improvement in fuel economy. Similarly, both of the exhaust valves as well are basically opened and closed at the same timing with respect to each other, except that in some cases, one exhaust valve is maintained in the closed state and only the other exhaust valve is opened and closed, depending on an operational state of the internal combustion engine.

A description will now first be given of an operational state of the ECU 10 realized so as to supply the #1 solenoid valve 12-1 and the #2 solenoid valve 12-2 with the exciting currents having the wave forms shown in FIG. 2(*a*) and (*b*) when the #1 solenoid valve 12-1 and the #2 solenoid valve 12-2, which form the intake valves provided for the same cylinder, are synchronously opened and closed.

FIG. 4 through FIG. 7 show three operational states of the ECU 10 realized so as to supply the #1 upper coil 48-1 and the #2 upper coil 48-2 with the exciting currents having current patterns shown in FIG. 2(*a*). The FETs which are set to the ON state in FIG. 4 through FIG. 7 and in similar FIGS shown below are marked with a circle.

Figure 4:
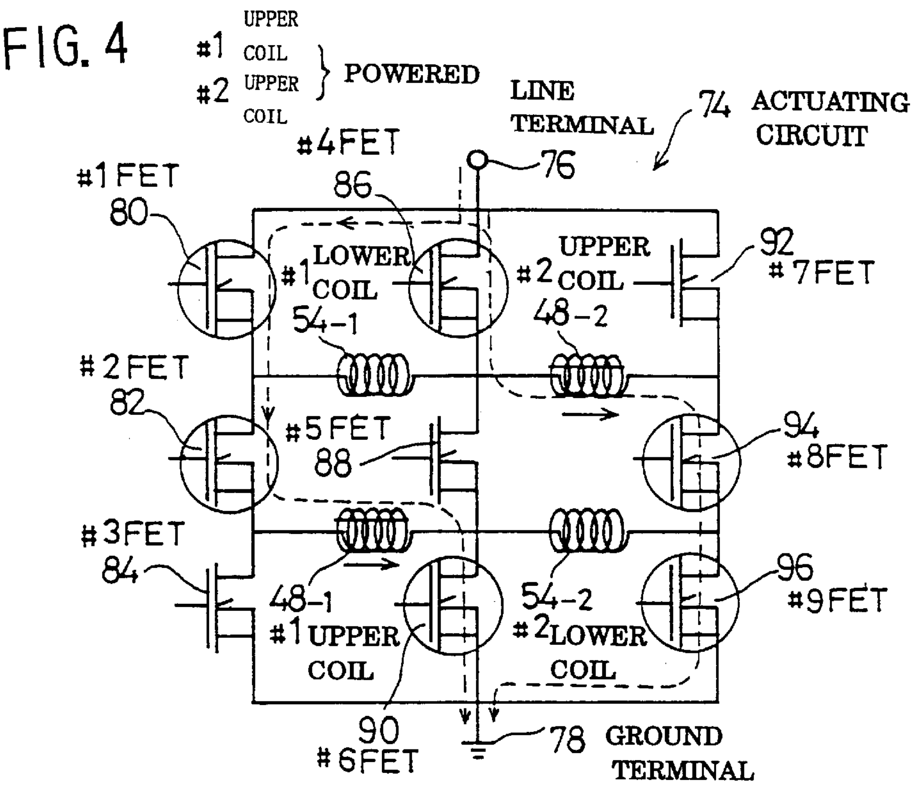
FIG. 4 is a diagram showing an operational state of an actuating circuit wherein both of a #1 upper coil and a #2 upper coil are set to a powered state.

The state shown in FIG. 4 is realized by setting the #1 FET 80, the #2 FET 82, the #4 FET 86, the #6 FET 90, the #8 FET 94 and the #9 FET 96 of the actuating circuit 74 to the ON state and the other FETs to the OFF state. In this state, a circuit is made from the line terminal 76 to the ground terminal 78 by way of the #1 FET 80, #2 FET 82, the #1 upper coil 48-1 and the #6 FET 90. Thus, the #1 upper coil 48-1 is supplied with the exciting current flowing from the #2 FET 82 side in the direction of the #6 FET 90 side (in a rightward direction in FIG. 4; hereinafter this direction is referred to as a positive direction of the #1 upper coil 48-1). Hereinafter, a state wherein a coil is supplied with an exciting current in a positive direction is referred to as a powered state of the coil. Further, in the state shown in FIG. 4, a circuit is made from the line terminal 76 to the ground terminal 78 by way of the #4 FET 86, the #2 upper coil 48-2, the #8 FET 94 and the #9 FET 96. Thus, the #2 upper coil 48-2 is supplied with the exciting current flowing from the #4 FET 86 side in the direction of the #8 FET 94 side (in the rightward direction in FIG. 4; hereinafter this direction is referred to as a positive direction of the #2 upper coil 48-2).

That is, the #2 upper coil 48-2 is also set to the powered state. The magnitude of a current flowing through a coil in the powered state corresponds to the above described maximum exciting current IMAX.

In the state shown in FIG. 4, the exciting current flowing through the #1 lower coil 54-1 is substantially zero since both ends of the #1 lower coil 54-1 are short-circuited by the #1 FET 80 and the #4 FET 86 set to the ON state. Similarly, the exciting current flowing through the #2 lower coil 54-2 is substantially zero since both ends of the #2 lower coil 54-2 are short-circuited by the #6 FET 90 and the #9 FET 96 set to the ON state.

Further, as described above, in the state shown in FIG. 4, the maximum exciting current IMAX supplied to the #1 upper coil 48-1 flows through the #1 FET 80, the #2 FET 82 and the #6 FET 90, while the maximum exciting current IMAX supplied to the #2 upper coil 48-2 flows through the #4 FET 86, the #8 FET 94 and the #9 FET 96. That is, heat generation in the FETs can be controlled because the maximum exciting currents IMAX supplied to the #1 upper coil 48-1 and the #2 upper coil 48-2 do not flow through the same FET.

Figure 5:
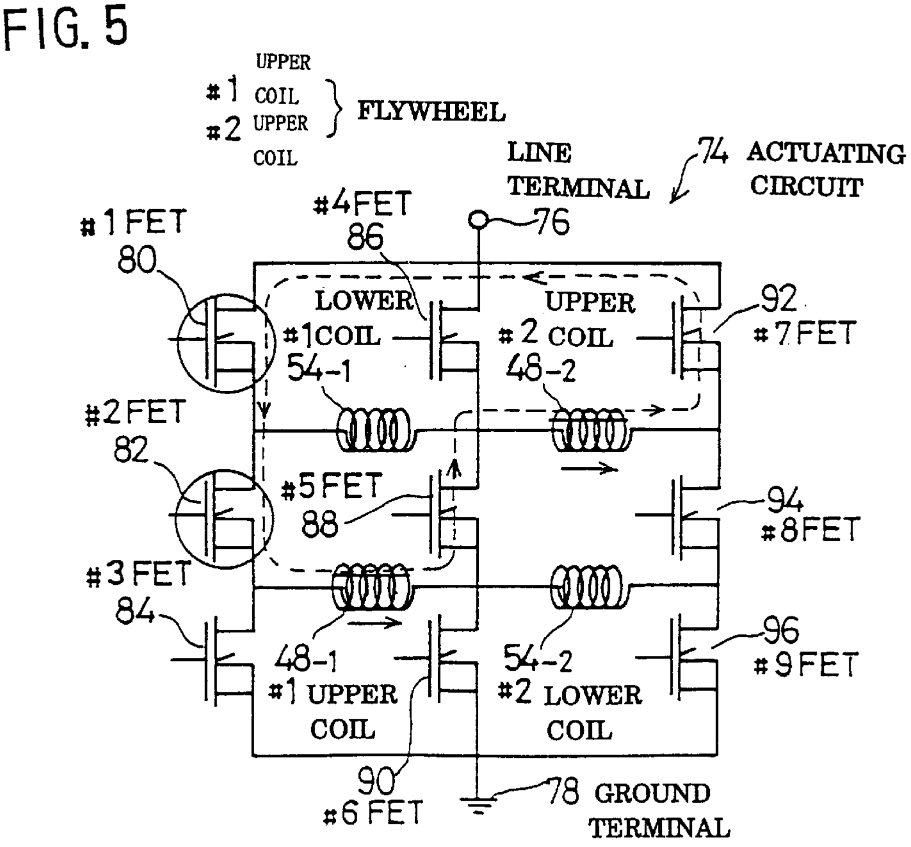
FIG. 5 is a diagram showing an operational state of the actuating circuit wherein both of the #1 upper coil and the #2 upper coil are set to a flywheel state.

The state shown in FIG. 5 is realized by setting the #1 FET 80 and the #2 FET 82 of the actuating circuit 74 to the ON state and the other FETs to the OFF state. In this state, a closed circuit is made, starting from and returning to the #1 FET 80 by way of the #2 FET 82, a first upper coil 48-1, the internal diode of the #5 FET 88, a second upper coil 48-2 and the internal diode of the #7 FET 92. The directions of the above described currents in the positive direction of the #1 upper coil 48-1 and the #2 upper coil 48-2 correspond to the direction of this closed circuit. Therefore, by switching from the powered state shown in FIG. 4 to the state shown in FIG. 5, currents in the positive direction generated by the counterelectromotive forces of the #1 upper coil 48-1 and the #2 upper coil 48-2, namely, flywheel currents can flow through the #1 upper coil 48-1 and the #2 upper coil 48-2 without a current being supplied from the line terminal 76 to the actuating circuit 74. Hereinafter, a state wherein the flywheel current flows through a coil is referred to as a flywheel state of the coil. In the flywheel state, the magnitude of a current flowing through a coil is gradually diminished by a circuit resistance.

Figure 6:
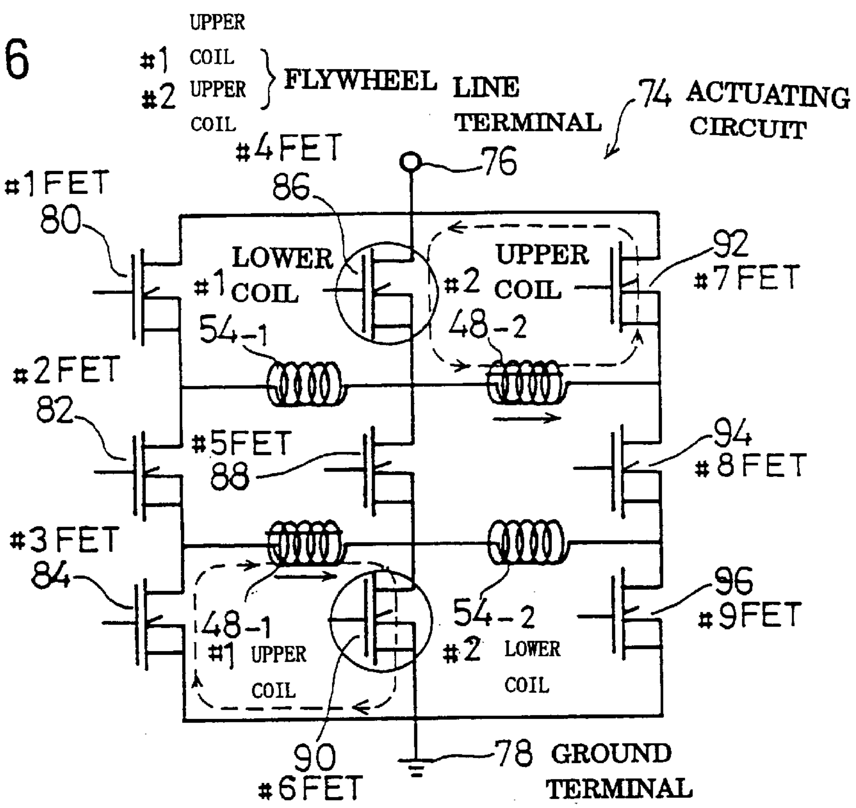
FIG. 6 is a diagram showing an operational state of the actuating circuit wherein both of the #1 upper coil and the #2 upper coil are set to the flywheel state.

The state shown in FIG. 6 is realized by setting the #4 FET 86 and the #6 FET 90 to the ON state and the other FETs to the OFF state. In this state, a closed circuit is made, starting from and returning to the #6 FET 90 by way of the internal diode 84 of the #3 FET 84 and the #1 upper coil 48-1. Further, in the state shown in FIG. 6, a closed circuit is made, starting from and returning to the #4 FET 86 by way of the #2 upper coil 48-2 and the internal diode of the #7 FET 92. The directions of the currents in the positive direction of the #1 upper coil 48-1 and the #2 upper coil 48-2 correspond to the directions of these closed circuits. Therefore, also in the state shown in FIG. 6, both of the #1 upper coil 48-1 and the #2 upper coil 48-2 are set to the flywheel state as in the state shown in FIG. 5.

Figure 7:
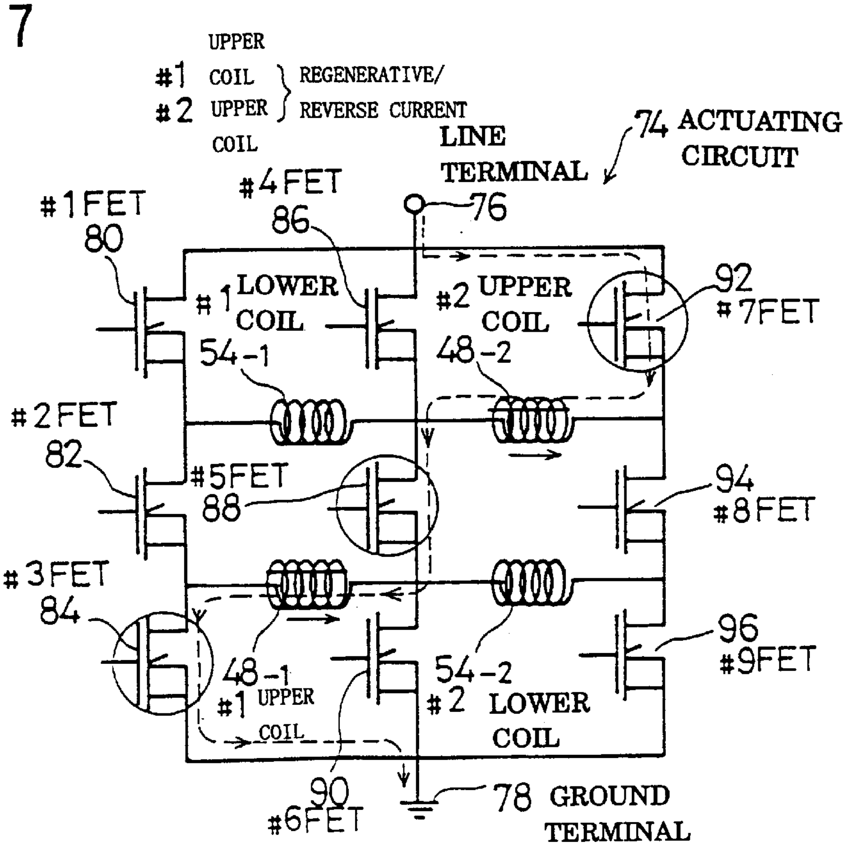
FIG. 7 is a diagram showing an operational state of the actuating circuit wherein both of the #1 upper coil and the #2 upper coil are set to a regenerative/reverse current state.

The state shown in FIG. 7 is realized by setting the #3 FET 84, the #5 FET 88 and the #7 FET 92 to the ON state and the other FETs to the OFF state. In this state, a circuit is made from the line terminal 76 to the ground terminal 78 by way of the #7 FET 92, the #2 upper coil 48-2, the #5 FET 88, the #1 upper coil 48-1 and the #3 FET 84. In this case, in a state wherein the sum of the counterelectromotive forces generated in the #1 upper coil 48-1 and the #2 upper coil 48-2 is larger than the supply voltage V supplied to the line terminal 76, the currents in the positive direction flowing through the #1 upper coil 48-1 and the #2 upper coil 48-2 are promptly reduced to zero by being withdrawn to the power supply side as a regenerative energy. On the other hand, in a state wherein the sum of the above mentioned counterelectromotive forces is smaller than the supply voltage V, the #2 upper coil 48-2 and the #1 upper coil 48-1 are supplied with the exciting current flowing from the #7 FET 92 side in the direction of the #5 FET 88 side (in a leftward direction in FIG. 7) and the exciting current flowing from the #5 FET 88 side in the direction of the #3 FET 84 side (in the leftward direction in FIG. 7), respectively. These exciting currents supplied to the #1 upper coil 48-1 and the #2 upper coil 48-2 are in the reverse direction to the currents in the positive direction. That is, in the state shown in FIG.7, the #1 upper coil 48-1 and the #2 upper coil 48-2 can be supplied with the demagnetizing currents IR in the reverse direction. Hereinafter, a state wherein a current generated by an counterelectromotive force of a coil is withdrawn to the power supply side as a regenerative energy or an exciting current in the reverse direction is supplied is referred to as a regenerative/reverse current state of the coil.

As described above, the #1 upper coil 48-1 and the #2 upper coil 48-2 are set to the powered state in the state shown in FIG. 4, to the flywheel state in the state shown in FIG. 5 or FIG. 6, and to the regenerative/reverse current state in the state shown in FIG. 7. Therefore, the ECU 10 can supply the #1 upper coil 48-1 and the #2 upper coil 48-2 with the maximum exciting currents IMAX by realizing the state shown in FIG. 4 during Period A shown in FIG. 2(*a*), and can reduce the exciting currents supplied to the #1 upper coil 48-1 and the #2 upper coil 48-2 from the IMAX to the IH by properly switching and realizing the states shown in FIG. 4 through FIG. 7 during Period B shown in FIG. 2(*a*). Further, the ECU 10 can hold the exciting currents supplied to the #1 upper coil 48-1 and the #2 upper coil 48-2 to the holding currents IH by properly switching and realizing the state shown in FIG. 4 and the state shown in FIG. 5 or FIG. 6 during Period C shown in FIG. 2(*a*), and can supply the #1 upper coil 48-1 and the #2 upper coil 48-2 with the demagnetizing currents IR by realizing the state shown in FIG. 7 during Period D shown in FIG. 2(*a*).

Thus, in the present embodiment, the exciting currents supplied to the #1 upper coil 48-1 and the #2 upper coil 48-2 can be controlled in accordance with the wave forms shown in FIG. 2(*a*) and (*b*) by the ECU properly switching and realizing the above mentioned states shown in FIG. 4 through FIG. 7.

A description has so far been given of the case wherein the exciting current supplied to the upper coil 48 is controlled, while states corresponding to FIG. 4 through FIG. 7, respectively can be formed of the lower coil 54 by setting to the ON state the FETs which are disposed symmetrically in a lateral direction in the drawings with the FETs set to the ON state in the states shown in FIG. 4 through FIG. 7.

That is, the #1 lower coil 54-1 and the #2 lower coil 54-2 can be set to the powered state by setting to the ON state the #2 FET 82, the #3 FET 84, the #4 FET 86, the #6 FET 90, the #7 FET 92 and the #8 FET 94 in correspondence to the state shown in FIG. 4. A positive direction of the #1 lower coil 54-1 is the direction toward the #2 FET 82 side from the #4 FET 86 side (in a leftward direction in the drawing), and a positive direction of the #2 lower coil 54-2 is the direction toward the #6 FET 90 side from the #8 FET 94 side (in the leftward direction in the drawing).

Further, the #1 lower coil 54-1 and the #2 lower coil 54-2 can be set to the flywheel state by setting the #7 FET 92 and the #8 FET 94 to the ON state in correspondence to the FIG. 5 or by setting the #4 FET 86 and the #6 FET to the ON state as in the state shown in FIG. 6. Moreover, the #1 lower coil 54-1 and the #2 lower coil 54-2 can be set to the regenerative/reverse current state by setting to the ON state the #1 FET 80, the #5 FET 88 and the #9 FET 96 in correspondence to the state shown in FIG. 7.

A description will now be given of an operation of the ECU 10 when one intake valve provided for a cylinder (for example, the #2 solenoid valve 12-2) is held in the closed state, and the other intake valve provided for the same cylinder(for example, the #1 solenoid valve 12-1) is actuated so as to be opened and closed.

Figure 8:
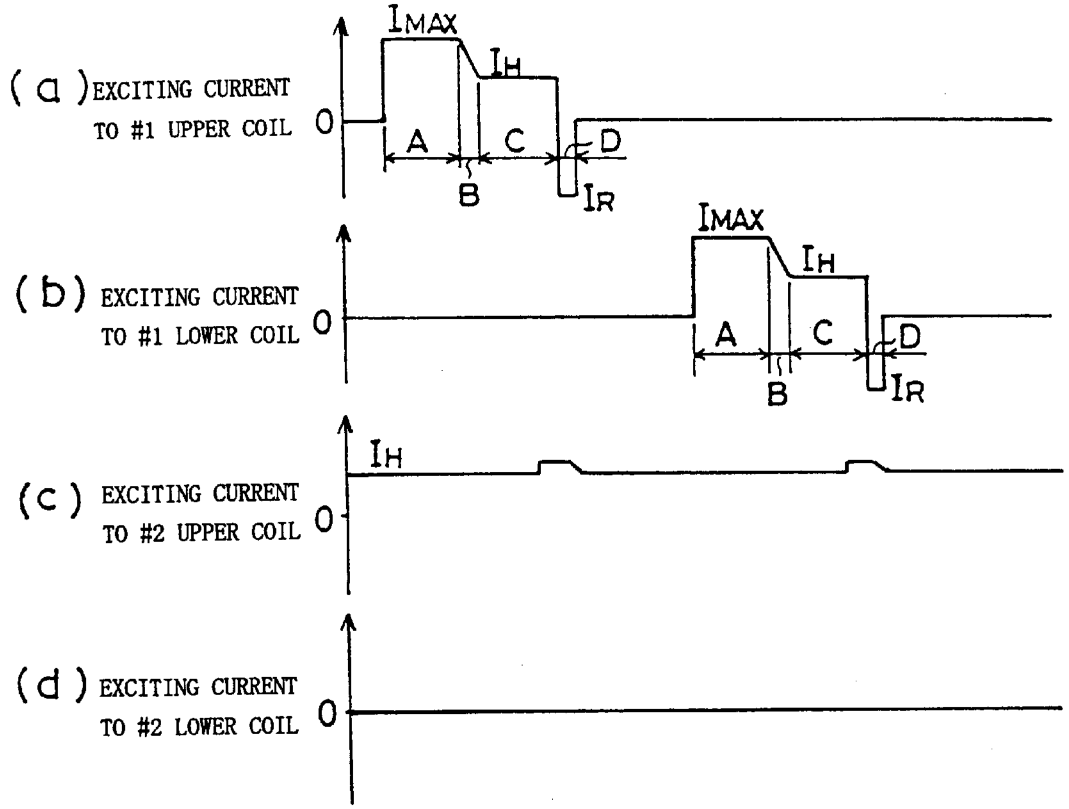
FIG. 8 is a diagram showing wave forms of exciting currents supplied to the #1 upper coil, a #1 lower coil, the #2 upper coil and a #2 lower coil when a #1 solenoid valve is operated so as to be opened and closed and a #2 solenoid valve is maintained in a closed state in the present embodiment.

FIG. 8 shows wave forms of the exciting currents supplied to the #1 upper coil 48-1, the #1 lower coil 54-1, the #2 upper coil 54-1 and the #2 lower coil 54-2, respectively so as to hold the #2 solenoid valve 12-2 in the closed state and to actuate the #1 solenoid valve 12-1 so that the #1 solenoid valve 12-1 will be opened and closed. As shown in FIG. 8(*a*) and (*b*), the #1 solenoid valve 12-1 is actuated so as to be opened and closed by supplying the #1 upper coil 48-1 and the #1 lower coil 54-1 with the exciting currents having the same wave forms as shown in FIG. 2(*a*) and (*b*). On the other hand, as shown in FIG. 8(*c*) and (*d*), the #2 solenoid valve is held in the closed state by keeping the exciting current supplied to the #2 upper coil 48-2 as large as the holding current $I_H$ and by rendering the exciting current supplied to the #2 lower coil 54-2 zero. However, the exciting current supplied to the #2 upper coil 48-2 is momentarily increased just before the demagnetizing current $I_R$ is supplied to the #1 upper coil 48-1 or the #1 lower coil 54-1. The reason for this will be discussed later.

The wave forms shown in FIG. 8 can be realized by properly switching states shown in FIG. 9 through FIG. 16 in addition to the above described state shown in FIG. 4 and the above described state shown in FIG. 5 or FIG. 6. A description will first be given of a case wherein the exciting current is supplied to the #1 upper coil 48-1 (Periods A, B, C and D shown in FIG. 8(*a*)). The wave forms of Periods A, B, C and D shown in FIG. 8(*a*) are realized by properly switching the states shown in FIG. 9 through FIG. 11 in addition to the state shown in FIG. 4 and the state shown in FIG. 5 or FIG. 6.

Figure 9:
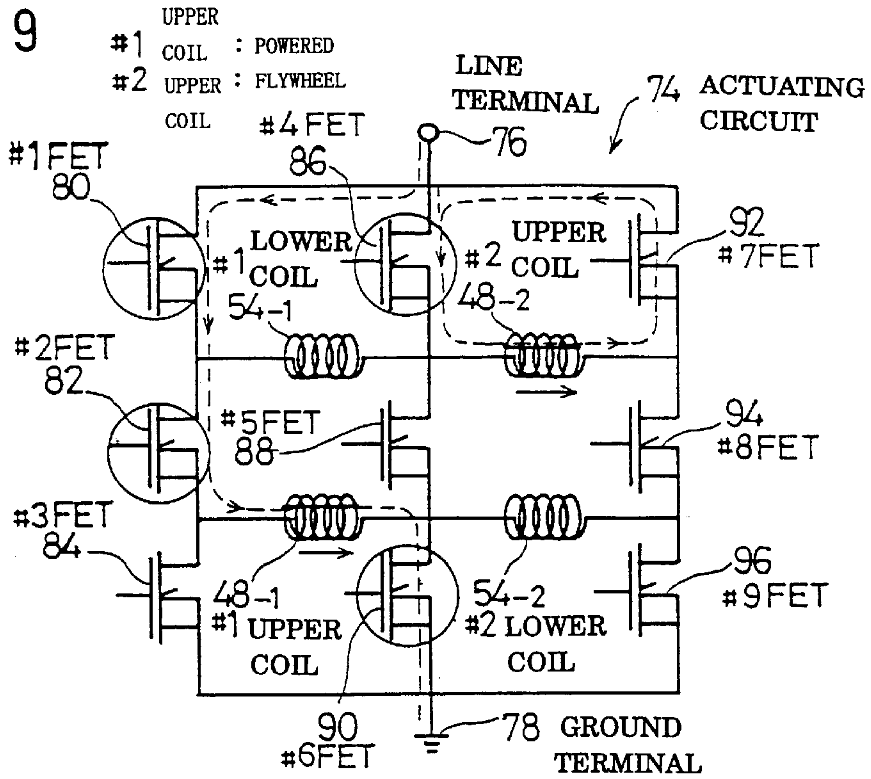
FIG. 9 is a diagram showing an operational state of the actuating circuit wherein the #1 upper coil is set to the powered state and the #2 upper coil is set to the flywheel state.

The state shown in FIG. 9 is realized by setting the #1 FET 80, the #2 FET 82, the #4 FET 86 and the #6 FET 90 to the ON state and the other FETs to the OFF state. In this state, a circuit is made from the line terminal 76 to the ground terminal 78 by way of the #1 FET 80, the #2 FET 82, the #1 upper coil 48-1 and the #6 FET 90. Thus, the maximum exciting current $I_{MAX}$ in the positive direction is supplied from the line terminal 76 to the #1 upper coil 48-1. That is, the #1 upper coil 48-1 is set to the powered state. Further, in the state shown in FIG. 9, a closed circuit is made, starting from and returning to the #4 FET 86 by way of the #2 upper coil 48-2 and the internal diode of the #7 FET 92. Thus, the flywheel current can flow through the #2 upper coil 48-2. That is, the #2 upper coil 48-2 is set to the flywheel state.

Figure 10:
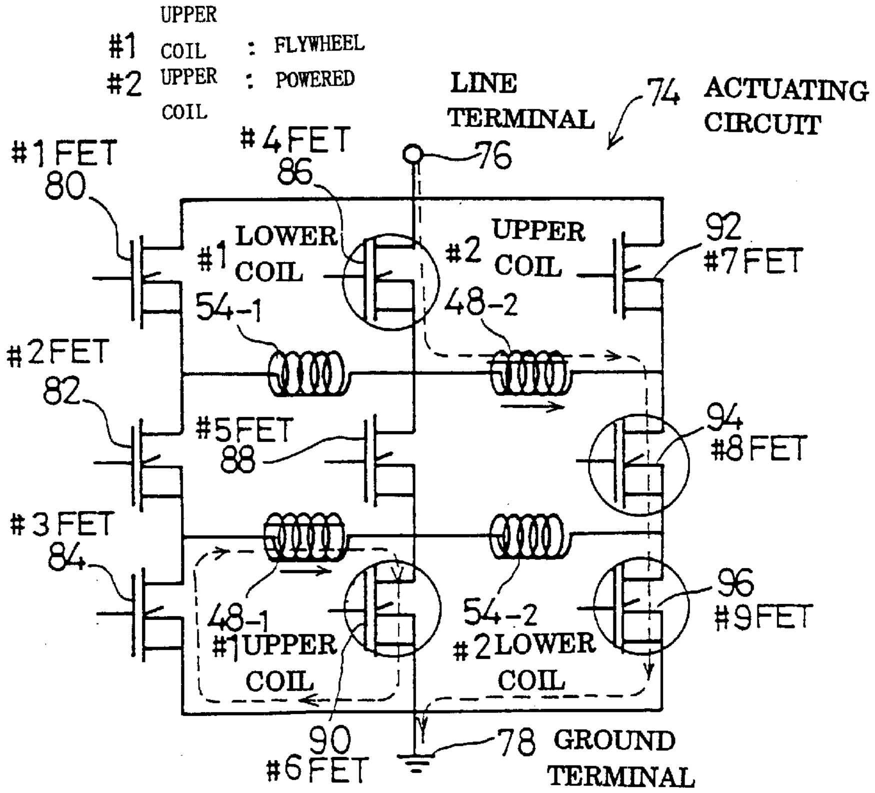
FIG. 10 is a diagram showing an operational state of the actuating circuit wherein the #1 upper coil is set to the flywheel state and the #2 upper coil is set to the powered state.

The state shown in FIG. 10 is realized by setting the #4 FET 86, the #6 FET 90, the #8 FET 94 and the #9 FET 96 to the ON state and the other FETs to the OFF state. In this state, a closed circuit is made, starting from the #6 FET 90 and returning to the #3 FET 90 by way of the internal diode of the #3 FET 84 and the #1 upper coil 48-1. Thus, the #1 upper coil 48-1 is set to the flywheel state. Further, in the state shown in FIG. 10, a circuit is made from the line terminal 76 to the ground terminal 78 by way of the #4 FET 86, the #2 upper coil 48-2, the #8 FET 94 and the #9 FET 96. Thus, the #2 upper coil 48-2 is set to the powered state.

Figure 11:
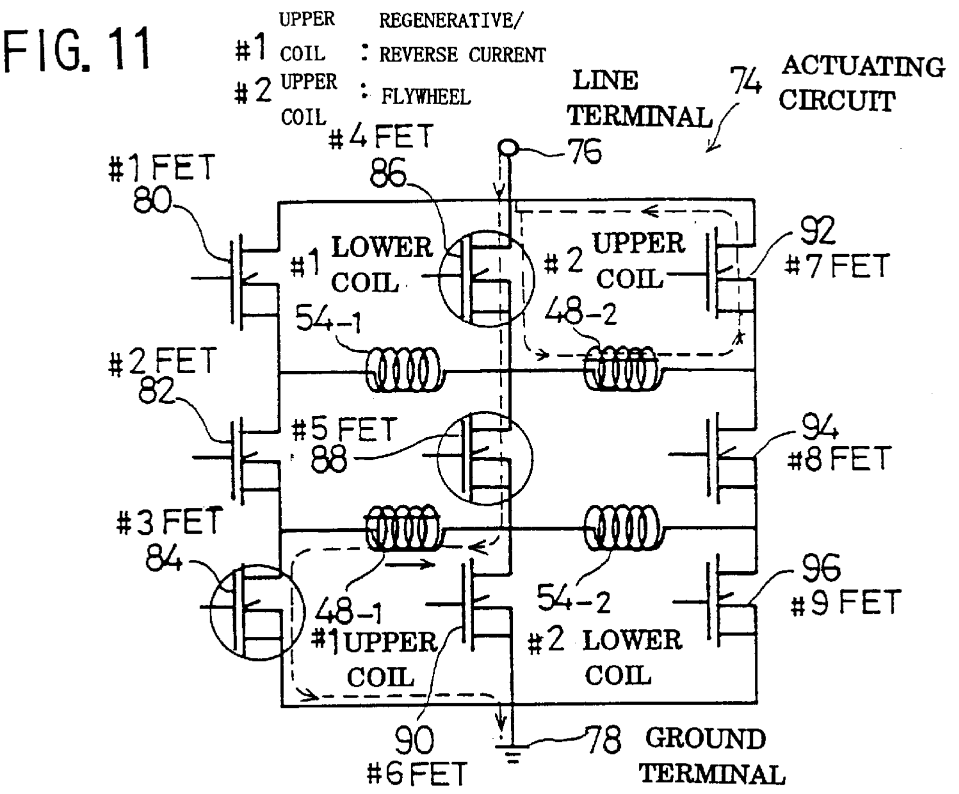
FIG. 11 is a diagram showing an operational state of the actuating circuit wherein the #1 upper coil is set to the regenerative/reverse current state and the #2 upper coil is set to the flywheel state.

The state shown in FIG. 11 is realized by setting to the ON state the #3 FET 84, the #4 FET 86 and the #5 FET 88. In this state, a circuit is made from the line terminal 76 to the ground terminal 78 by way of the #4 FET 86, the #5 FET 88, the #1 upper coil 48-1 and the #3 FET 84. Thus, the #1 upper coil is set to the regenerative/reverse current state. Further, in the state shown in FIG. 11, a closed circuit is made, starting from and returning to the #4 FET 86 by way of the #2 upper coil 48-2 and the internal diode of the #7 FET 92. Thus, the #2 upper coil 48-2 is set to the flywheel state.

As described above, both of the #1 upper coil 48-1 and the #2 upper coil 48-2 are set to the powered state in the state shown in FIG. 4. On the other hand, in the state shown in FIG. 9, the #1 upper coil 48-1 is set to the powered state while the #2 upper coil 48-2 is set to the flywheel state. Therefore, the wave form of the Period A shown in FIG. 8(*a*) can be realized by switching the states shown in FIG. 4 and in FIG. 9 so that the current supplied to the upper coil 48-2 will correspond to the holding current $I_H$.

Further, in the states shown in FIG. 4, FIG. 5 (or FIG. 6), FIG. 9 and FIG. 10, all the combinations of the powered state and the flywheel state are realized with respect to the #1 upper coil 48-1 and the #2 upper coil 482. Moreover, in the state shown in FIG. 11, a flywheel flows through the #2 upper coil 48-2 and a current in the reverse direction is supplied to the #1 upper coil 48-1. Therefore, the wave form of Period B shown in FIG. 8(*a*) can be realized by switching the above described five states so that the exciting current supplied to the #1 upper coil 48-1 will be reduced to the holding current $I_H$ with a desired slope and the exciting current supplied to the #2 upper coil 48-2 will be held to the holding current $I_H$.

Further, during Period C shown in FIG. 8(*a*), the exciting currents supplied to the #1 upper coil 48-1 and the #2 upper coil 48-2 are held to the holding current $I_H$. Therefore, the wave form of Period C shown in FIG. 8(*a*) can be realized by switching the states shown in FIG. 4 and in FIG. 5.

Moreover, a current in the reverse direction $I_R$ is supplied to the #1 upper coil 48-1 during Period D shown in FIG. 8(*a*). Therefore, the wave form of Period D shown in FIG. 8(*a*) can be realized by forming the state shown in FIG. 11. However, in the state shown in FIG. 11, since the #2 upper coil 48-2 is set to the flywheel state, the magnitude of the exciting current is decreased with the passage of time. Therefore, in the present embodiment, the magnitude of the exciting current supplied to the #2 upper coil 48-2 is increased by a predetermined amount in expectation of the decrease in the exciting current during the Period D shown in FIG. 8(*a*) just before the Period D is entered on (that is, at the end of the Period C). The increase in the exciting current supplied to the #2 upper coil 48-2 in the Period C shown in FIG. 8(*a*) can be realized, for example, by increasing the time ratio of the state shown in FIG. 10 (the state wherein the #2 upper coil 48-2 is set to the powered state) relative to the time ratio of the state shown in FIG. 5 or FIG. 6 (the state wherein the #2 upper coil 48-2 is set to the flywheel state) in switching the above described five states.

A description will now be given of a case wherein the exciting current is supplied to the #1 lower coil 54-1 (Periods A, B, C and D shown in FIG. 8(*b*)). The wave forms of Periods A, B, C and D shown in FIG. 8(*b*) are realized by properly switching the states shown in FIG. 12 through FIG. 16.

Figure 12:
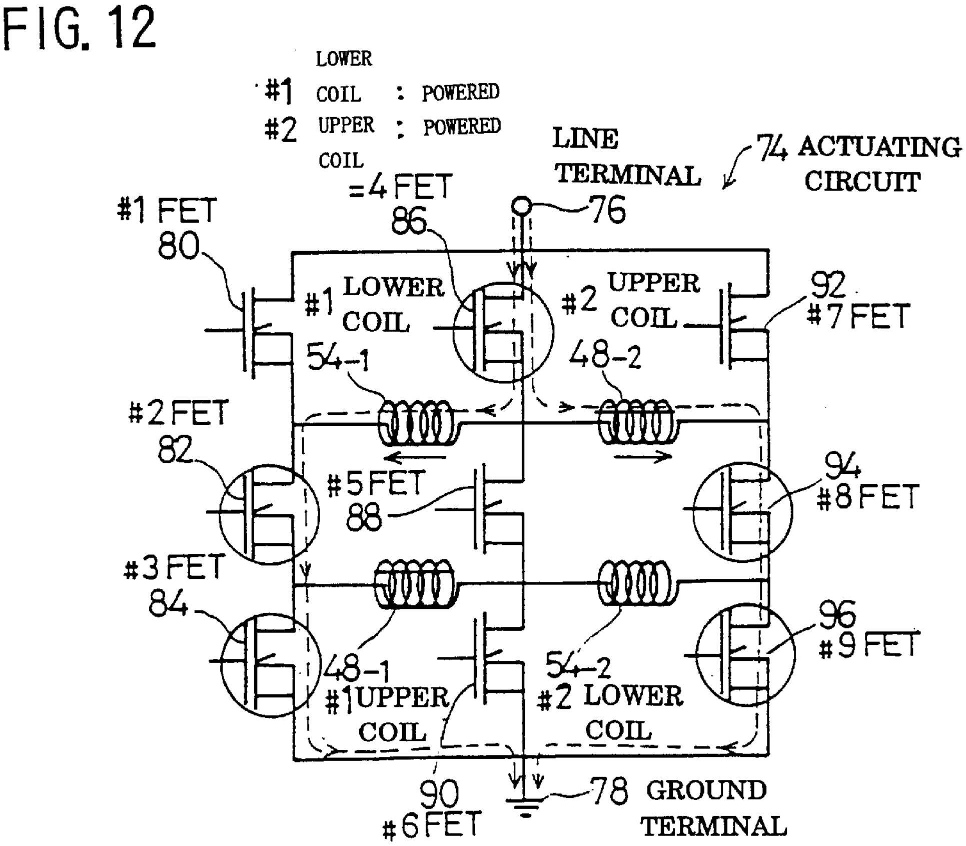
FIG. 12 is a diagram showing an operational state of the actuating circuit wherein both of the #1 lower coil and the #2 upper coil are set to the powered state.

The state shown in FIG. 12 is realized by setting the #2 FET 82, the #3 FET 84, the #4 FET 86, the #8 FET 94 and the #9 FET 96 to the ON state and the other FETs to the OFF state. In this state, a circuit is made from the line terminal 76 to the ground terminal 78 by way of the #4 FET 86, the #1 lower coil 54-1, the #2 FET 82 and the #3 FET 84, and a circuit is made from the line terminal 76 to the ground terminal 78 by way of the #4 FET 86, the #2 upper coil 48-2, the #8 FET 94 and the #9 FET 96. Thus, both of the #1 lower coil 54-1 and the #2 upper coil 48-2 are set to the powered state.

Figure 13:
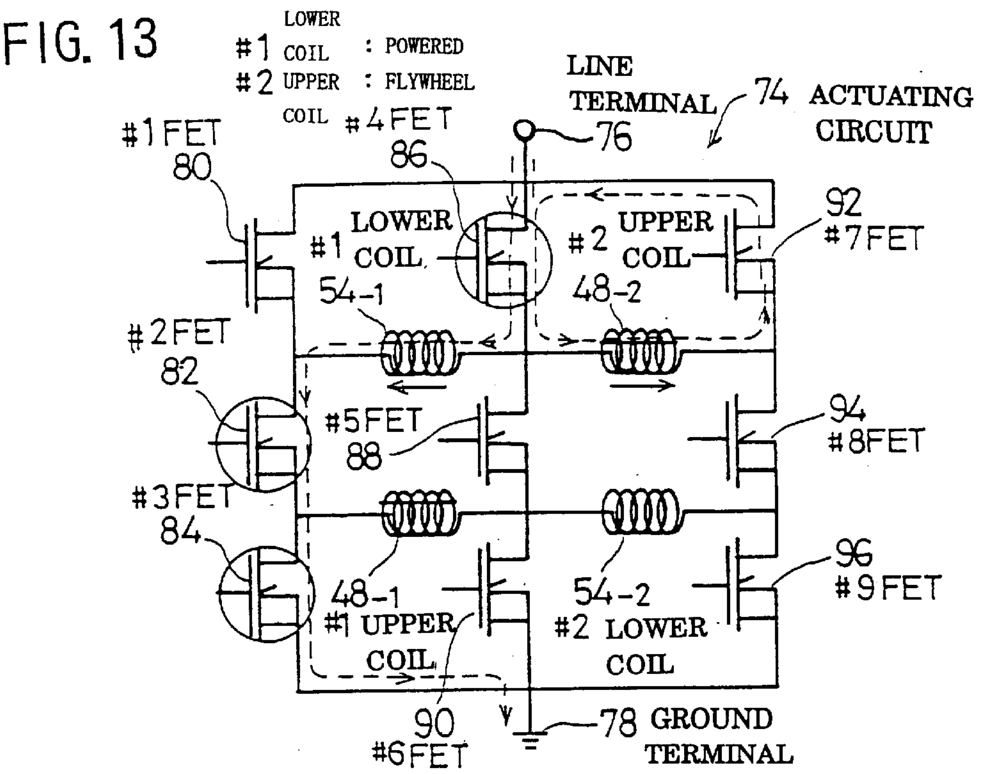
FIG. 13 is a diagram showing an operational state of the actuating circuit wherein the #1 lower coil is set to the powered state and the #2 upper coil is set to the flywheel state.

The state shown in FIG. 13 is realized by setting the #2 FET 82, the #3 FET 84 and the #4 FET 86 to the ON state and the other FETs to the OFF state. In this state, a circuit is made from the line terminal 76 to the ground terminal 78 by way of the #4 FET 86, the #1 lower coil 54-1, the #2 FET 82 and the #3 FET 84. Thus, the #1 lower coil 54-1 is set to the powered state. Further, in the state shown in FIG. 13, a closed circuit is made, starting from and returning to the #4 FET 86 by way of the #2 upper coil 48-2 and the internal diode of the #7 FET 92. Thus, the #2 upper coil 48-2 is set to the flywheel state.

Figure 14:
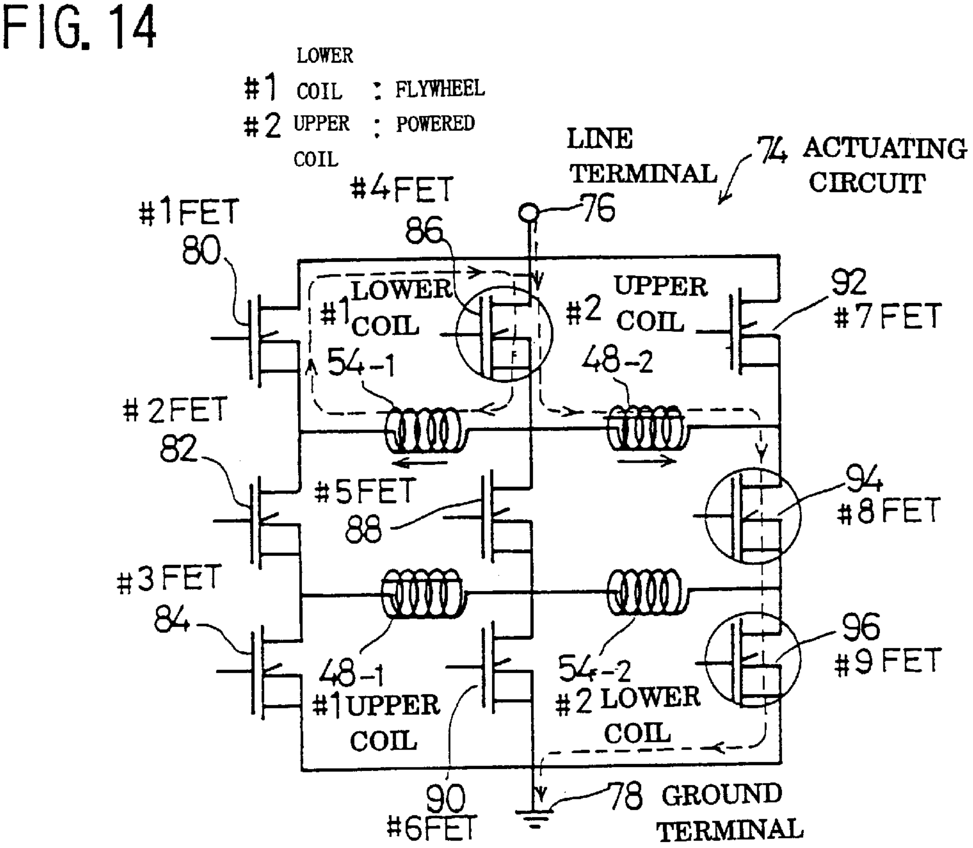
FIG. 14 is a diagram showing an operational state of the actuating circuit wherein the #1 lower coil is set to the flywheel state and the #2 upper coil is set to the powered state.

The state shown in FIG. 14 is realized by setting the #4 FET 86, the #8 FET 94 and the #9 FET 96 to the ON state and the other FETs to the OFF state. In this state, a closed circuit is made, starting from and returning to the #4 FET 86 by way of the #1 lower coil 54-1 and the internal diode of the #1 FET 80. Thus, the #1 lower coil 54-1 is set to the flywheel state. Further, in the state shown in FIG. 14, a circuit is made from the line terminal 76 to the ground terminal 78 by way of the #4 FET 86, the #2 upper coil 48-2, the #8 FET 94 and the #9 FET 96. Thus, the #2 upper coil 48-2 is set to the powered state.

Figure 15:
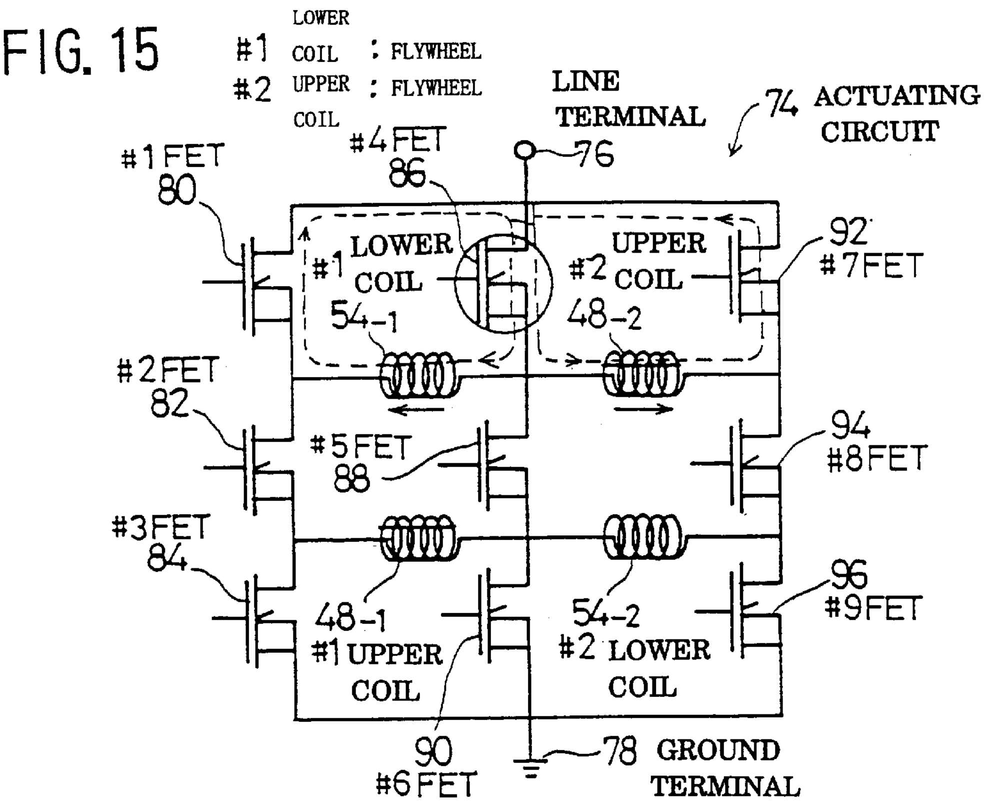
FIG. 15 is a diagram showing an operational state of the actuating circuit wherein both of the #1 lower coil and the #2 upper coil are set to the flywheel state.

The state shown in FIG. 15 is realized by setting only the #4 FET 86 to the ON state and the other FETs to the OFF state. In this state, a closed circuit is made, starting from and returning to the #4 FET 86 by way of the #1 lower coil 54-1 and the internal diode of the #1 FET 80, and a closed circuit is made, starting from and returning to the #4 FET 86 by way of the #2 upper coil 48-2 and the internal diode of the #7 FET 92. Thus, both of the #1 lower coil 54-1 and the #2 upper coil 48-2 are set to the flywheel state.

Figure 16:
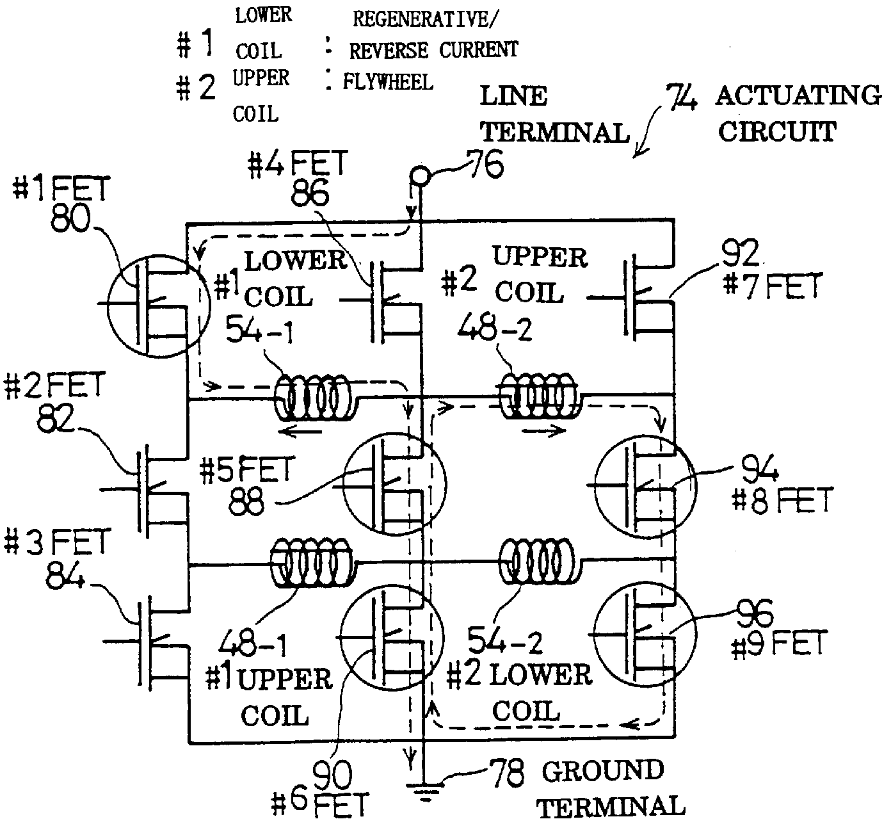
FIG. 16 is a diagram showing an operational state of the actuating circuit wherein the #1 lower coil is set to the regenerative/reverse current state and the #2 upper coil is set to the flywheel state.

The state shown in FIG. 16 is realized by setting the #1 FET 80, the #5 FET 88, the #6 FET 90, the #8 FET 94 and the #9 FET 96 to the ON state and the other FETs to the OFF state. In this state, a circuit is made from the line terminal 76 to the ground terminal 78 by way of the #1 FET 80, the #1 lower coil 54-1, the #5 FET 88 and the #6 FET 90. Thus, the #1 lower coil 54-1 is set to the regenerative/reverse current state. Further, in the state shown in FIG. 16, a closed circuit is made, starting from and returning to the #6 FET 90 by way of the #5 FET 88, the #2 upper coil 48-2, the #8 FET 94 and the #9 FET 96. Thus, the #2 upper coil 48-2 is set to the flywheel state.

As described above, both of the #1 lower coil 54-1 and the #2 upper coil 48-2 are set to the powered state in the state shown in FIG. 12. On the other hand, in the state shown in FIG. 13, the #1 lower coil 54-1 is set to the powered state, while the #2 upper coil 48-2 is set to the flywheel state. Therefore, the wave form of Period A shown in FIG. 8(*b*) is realized by switching the states shown in FIG. 12 and in FIG. 13 so that the exciting current supplied to the #2 upper coil 48-2 will be maintained to the holding current $I_H$.

Further, according to the states shown in FIG. 12, FIG. 13, FIG. 14 and FIG. 15, all the combinations of the powered state and the flywheel state are realized with respect to the #1 lower coil 54-1 and the #2 upper coil 482. Moreover, in the state shown in FIG. 16, the #2 upper coil 48-2 is set to the flywheel state, and the #1 lower coil 54-1 is set to the regenerative/reverse current state. Therefore, the wave form of Period B shown in FIG. 8(*b*) can be realized by switching the above described five states so that the exciting current supplied to the #1 lower coil 54-1 will be reduced to the holding current $I_H$ with a desired slope and the exciting current supplied to the #2 upper coil 48-2 will be held to the holding current $I_H$. Further, during Period C shown in FIG. 8(*b*), each of the exciting currents supplied to the #1 lower coil 48-1 and the #2 upper coil 48-2 is held to the holding current $I_H$. Therefore, the wave form of Period C shown in FIG. 8(*a*) is realized by switching the state shown in FIG. 12 and in FIG. 15.

Moreover, the current in the reverse direction $I_R$ is supplied to the #1 lower coil 54-1 during Period D shown in FIG. 8(*b*). Therefore, the wave form of Period D shown in FIG. 8(*b*) can be obtained by realizing the state shown in FIG. 16. However, in the state shown in FIG. 16, the magnitude of the exciting current flowing through the #2 upper coil 48-2 is decreased with the passage of time because the #2 upper coil 48-2 is set to the flywheel state. Therefore, in the present embodiment, the magnitude of the exciting current supplied to the #2 upper coil 48-2 is increased by a predetermined amount in expectation of the decrease in the exciting current just before Period D is entered on (that is, at the end of Period C). The increase in the exciting current supplied to the #2 upper coil 48-2 in Period C shown in FIG. 8(*b*) is realized, for example, by increasing the time ratio of the state shown in FIG. 14 (the state wherein the #2 upper coil 48-2 is set to the powered state) relative to the time ratio of the state shown in FIG. 15 (the state wherein the #2 upper coil 48-2 is set to the flywheel state) in switching the above described states shown in FIG. 12 through FIG. 16.

A description has so far been given of the case wherein the #2 solenoid valve 12-2 is held in the closed state and the #1 solenoid valve 12-1 is actuated so as to be opened and closed, while it is also practicable that the #1 solenoid valve 12-1 is held in the closed state and the #2 solenoid valve 12-2 is actuated so as to be opened and closed. That is, states corresponding to the states shown in FIG. 9 through FIG. 16, respectively are realized by setting to the ON state the FETs which are disposed in centrosymmetrical positions with respect to the positions of the FETs which are set to the ON state in the states shown in FIG. 9 through FIG. 16.

For example, the #1 upper coil 48-1 can be set to the flywheel state and the #2 upper coil 48-2 can be set to the powered state by setting to the ON state the #9 FET 96, the #8 FET 94, the #6 FET 90 and the #4 FET 86, which are in the centrosymmetrical positions respectively with respect to the positions of the #1 FET 80, the #2 FET 82, the #4 FET 86 and the #6 FET 90, which are set to the ON state in the state shown in FIG. 9. Similarly, in correspondence to the state shown in FIG. 10, the #1 upper coil 48-1 can be set to the powered state and the #2 upper coil 48-2 can be set to the flywheel state by setting to the ON state the #6 FET 90, the #4 FET 86, the #2 FET 82 and the #1 FET;

in correspondence to the state shown in FIG. 11, the #1 upper coil 48-1 can be set to the flywheel state and the #2 upper coil 48-2 can be set to the regenerative/reverse current state by setting to the ON state the #7 FET 92, the #6 FET 90, and the #5 FET 88;

in correspondence to the state shown in FIG. 12, both of the #1 upper coil 48-1 and the #2 lower coil 54-2 can be set to the powered state by setting to the ON state the #8 FET 94, the #7 FET 92, the #6 FET 90, the #2 FET 82 and the #1 FET 80;

in correspondence to the state shown in FIG. 13, the #1 upper coil 48-1 can be set to the flywheel state and the #2 lower coil 54-2 can be set to the powered state by setting to the ON state the #8 FET 94, the #7 FET 92 and the #6 FET 90;

in correspondence to the state shown in FIG. 14, the #1 upper coil 48-1 can be set to the powered state and the #2 lower coil 54-2 can be set to the flywheel state by setting to the ON state the #6 FET 90, the #2 FET 82 and the #1 FET 80;

in correspondence to the state shown in FIG. 15, both of the #1 upper coil 48-1 and the #2 lower coil 54-2 can be set to the flywheel state by setting only the #6 FET 90 to the ON state;

in correspondence to the state shown in FIG. 16, the #1 upper coil 48-1 can be set to the flywheel state and the #2 lower coil 54-2 can be set to the regenerative/reverse current state by setting to the ON state the #9 FET 96, the #5 FET 88, the #4 FET 86, the #2 FET 82 and the #1 FET 80.

Then, by means of properly switching the above described states corresponding to the states of FIG. 9 through FIG. 16, respectively as in the above described case wherein the #2 solenoid valve 12-2 is held in the closed state while the #1 solenoid valve 12-1 is actuated so as to be opened and closed, the #2 solenoid valve 12-2 can be actuated so as to be opened and closed by supplying the #2 upper coil 48-2 and the #2 lower coil 54-2 with the exciting currents having the same wave forms as those of FIG. 8(*a*) and (*b*) while the exciting current supplied to the #1 upper coil 48-1 is held to the holding current $I_H$ (that is, while the #1 solenoid valve 12-1 is held in the closed state).

As described above, according to the present embodiment, each of the #1 upper coil 48-1, the #1 lower coil 54-1, the #2 upper coil 48-2 and the #2 lower coil 54-2 can be supplied with currents in both of the positive and the reverse directions. Thereby, the exciting currents supplied to the coils can be controlled in accordance with the current patterns shown in FIG. 3 or FIG. 8. Thus, according to the solenoid valve control apparatus of the present embodiment, the electromagnetic attracting force exerted between the armature 44 and the first electromagnet 46 or the second electromagnet 52 can be made to promptly vanish when the armature 44 comes in contact with the first electromagnet 46 or the second electromagnet 52. Therefore, the impact sound generated by the opening and closing operation of the solenoid valve 12 can be controlled and the durability of the solenoid valve 12 can be improved. Further, the excellent responsiveness of the solenoid valve 12 can be realized.

In the present embodiment, the above described performance is realized by forming the one actuating circuit 74 for a total of four solenoid coils provided for a pair of solenoid valves which form intake valves or exhaust valves provided for the same cylinder. That is, the exciting currents supplied to these four solenoid coils can be controlled by the nine switching means, namely, the #1 FET 80 through the #9 FET 96. On the other hand, when one solenoid valve is controlled by a bridged-H-type circuit as in the above described prior art, sixteen switching means are required for four solenoid coils. Therefore, a total of one hundred and twenty-eight switching means will be required when the conventional structure is applied to an internal combustion engine of a four-cylinder-four-valve type, while seventy-two switching means are sufficient according to the present embodiment.

Thus, according to the present embodiment, the above described performance can be realized with the far smaller required number than ever of switching means by providing the switching means of the FET 80 through the FET 96 for each of the solenoid valves 12, which are actuated to be opened and closed in synchronism with each other.

A description will now be given of a second embodiment of the present invention. A solenoid valve actuating apparatus of the present embodiment is realized by employing an ECU 110 instead of the ECU 10 in the solenoid valve control apparatus of the above described first embodiment.

Figure 17:
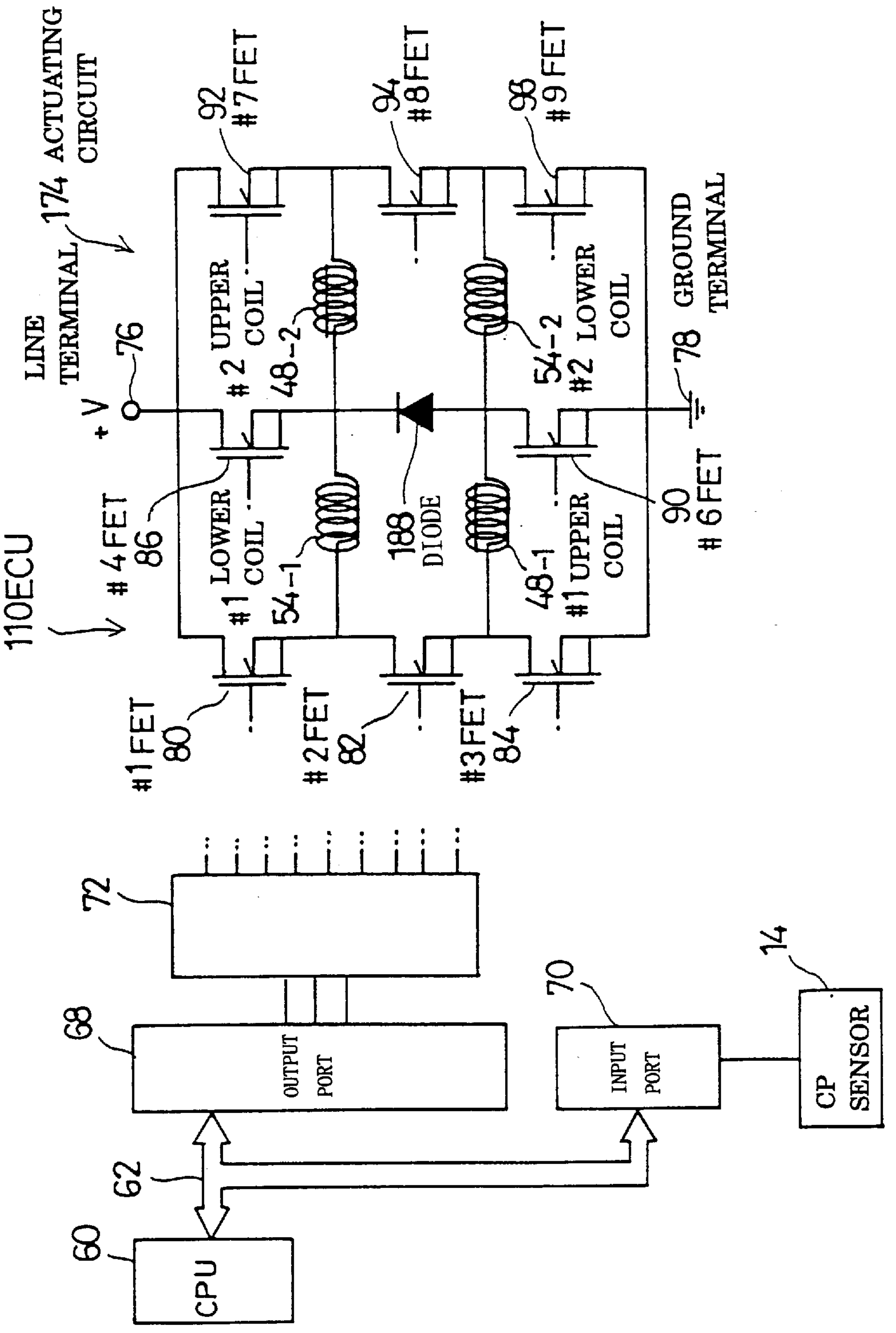
FIG. 17 is a diagram of an internal structure of an ECU provided for a solenoid valve actuating apparatus according to a second embodiment of the present invention.

FIG. 17 is a circuit diagram showing an internal structure of the ECU 110 of the present embodiment. In FIG. 17, the same structural portions as those in FIG. 3 are provided with the same reference numerals and the descriptions thereof are omitted or simplified. As shown in FIG. 17, the ECU 110 is provided with an actuating circuit 174. The actuating circuit 174 is realized by employing a diode 188 instead of the #5 FET 88 in the actuating circuit 74 of the above described embodiment. The diode 188 is disposed so as to allow a current to flow from the ground terminal 78 side in the direction of the line terminal 76.

Also in the present embodiment, basically, by setting to the ON state the same FETs that are set to the ON state in the states shown in FIG. 4 through FIG. 7 and FIG. 9 through FIG. 16 of the above described first embodiment, the same states as those states can be realized. Among those states, the #5 FET 88 is set to the OFF state in the states shown in FIG. 4, FIG. 5, FIG. 6, FIG. 9, FIG. 10, FIG. 12, FIG. 13, FIG. 14 and FIG. 15. The same states as those states can be realized by the diode 188 of the present embodiment achieving the same function as the internal diode of the #5 FET 88. On the other hand, the #5 FET 88 is set to the ON state in the states shown in FIG. 7, FIG. 11 and FIG. 16, while in the present embodiment, the same states as shown in FIG. 7, FIG. 11 and FIG. 16 cannot be realized because the diode 188 is provided instead of the #5 FET 88. A description will now be given of states corresponding to FIG. 7, FIG. 11 and FIG. 16 of the above described first embodiment with reference to FIG. 18 through FIG. 20.

Figure 18:
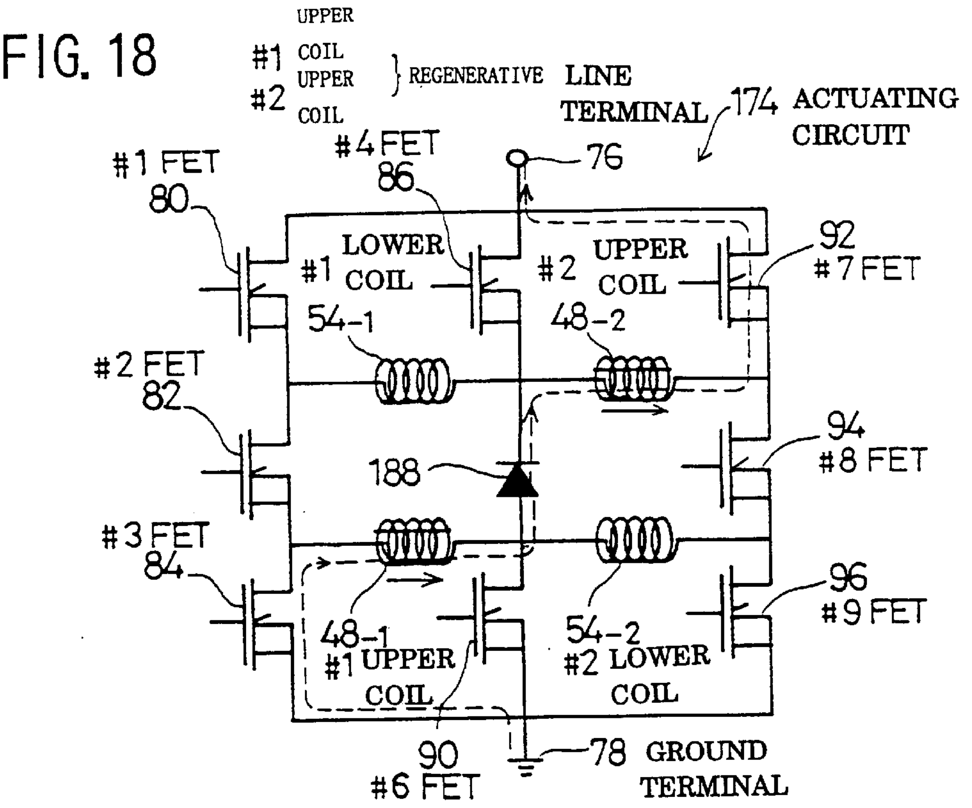
FIG. 18 is a diagram showing an operational state of an actuating circuit wherein both of a #1 upper coil and a #2 upper coil are set to a regenerative state.

FIG. 18 shows a state corresponding to above described FIG. 7 in the present embodiment. The state shown in FIG. 18 is realized by setting every FET to the OFF state. In this state, a circuit is made from the ground terminal 78 to the line terminal 76 by way of the internal diode of the #3 FET 84, the #1 upper coil 48-1, the diode 188, the #2 upper coil 48-2 and the internal diode of the #7 FET 92. Therefore, when the sum of the counterelectromotive forces generated in the #1 upper coil 48-1 and the #2 upper coil 48-2 is larger than the supply voltage V, currents flowing through these coils can be withdrawn to the power supply side as a regenerative energy as in the state shown in FIG. 7. However, as is different from the state shown in FIG. 7, the #1 upper coil 48-1 and the #2 upper coil 48-2 cannot be supplied with the demagnetizing currents $I_R$ in the reverse direction even with the #3 FET 84 and the #7 FET 92 being set to the ON state since the diode 188 prevents a current from flowing from the #2 upper coil 48-2 side to the #1 upper coil 48-1 side. Therefore, the #3 FET 84 and the #7 FET 92 are set to the OFF state in the state shown in FIG. 18. However, operations will remain the same if the #3 FET 84 and the #7 FET 92 are set to the ON state. Hereinafter, a state wherein a current flowing through a coil can be withdrawn as a regenerative energy, but a current in the reverse direction cannot be supplied is referred to as a regenerative state of the coil.

Figure 19:
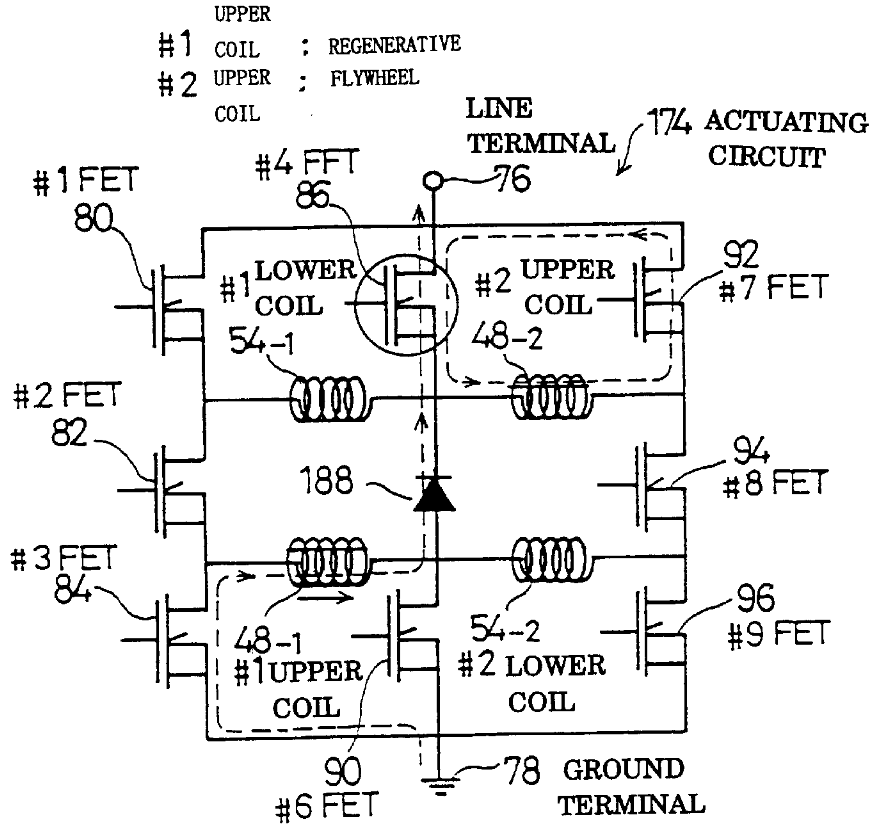
FIG. 19 is a diagram showing an operational state of the actuating circuit wherein the #1 upper coil is set to the regenerative state and the #2 upper coil is set to the flywheel state.

FIG. 19 shows a state corresponding to above described FIG. 11 in the present embodiment. The state shown in FIG. 19 is realized by setting the #4 FET 86 to the ON state and the other FETs to the OFF state. In this state, as in the state shown in FIG. 11, a closed circuit is made, starting from and returning to the #4 FET 86 by way of the #2 upper coil 48-2 and the internal diode of the #7 FET 92. Thus, the #2 upper coil 48-2 is set to the flywheel state. Further, in the state shown in FIG. 19, a circuit is made from the ground terminal 78 to the line terminal 76 by way of the #3 FET 84, the #1 upper coil 48-1, the diode 188 and the #4 FET 86. Thus, when the counterelectromotive force of the #1 upper coil 48-1 is larger than the supply voltage, a current flowing through the #1 upper coil 48-1 can be withdrawn to the power supply side as a regenerative energy as in the state shown in FIG. 11. However, as is different from the state shown in FIG. 11, the #1 upper coil 48-1 cannot be supplied with a current in the reverse direction even with the #3 FET 84 being set to the ON state since the diode 188 prevents a current from flowing from the #4 FET 86 side to the #1 upper coil 48-1 side. That is, in the state shown in FIG. 19, the #1 upper coil 48-1 is set to the regenerative state whether the #3 FET 84 is set to the ON state or to the OFF state.

Figure 20:
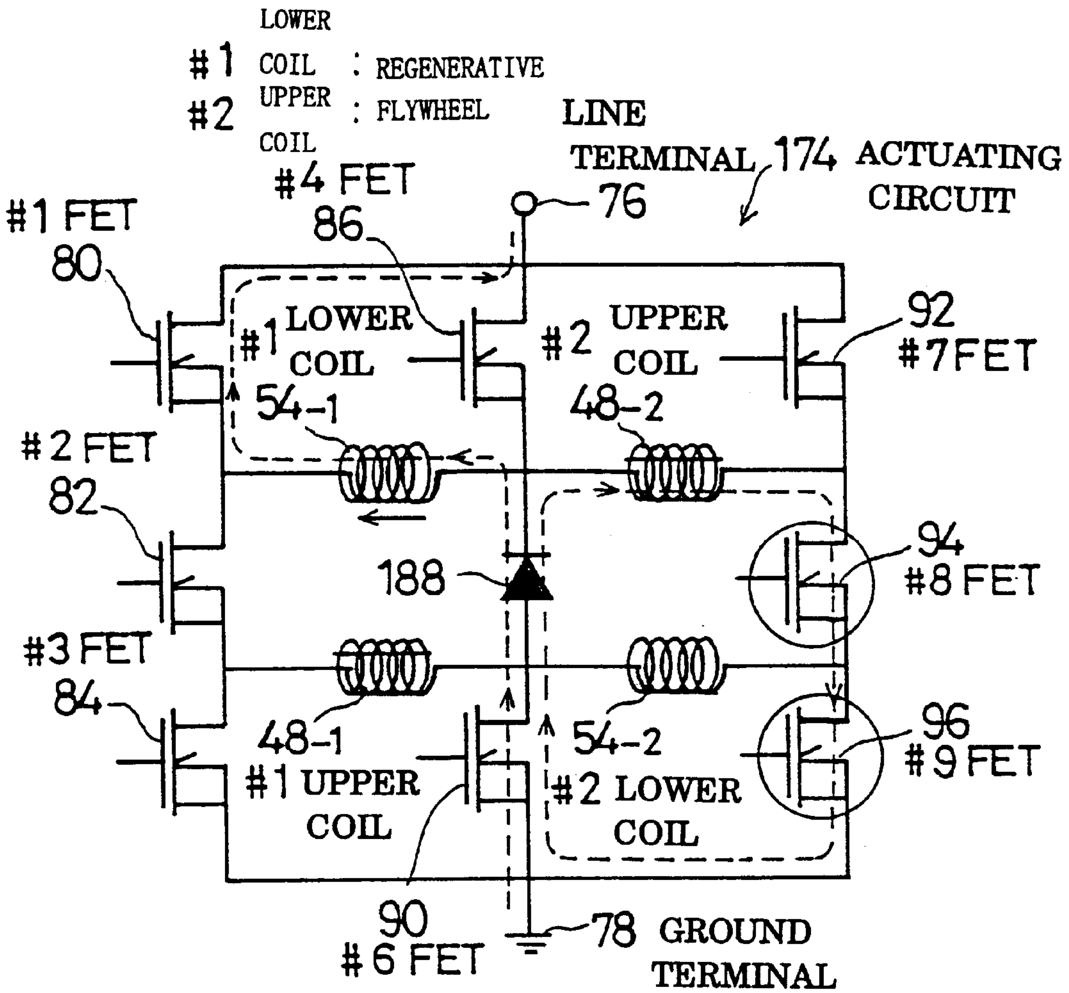
FIG. 20 is a diagram showing an operational state of the actuating circuit wherein a #1 lower coil is set to the regenerative state and the #2 upper coil is set to the flywheel state.

FIG. 20 shows a state corresponding to above described FIG. 16 in the present embodiment. The state shown in FIG. 20 is realized by setting the #8 FET 94 and the #9 FET 96 to the ON state and the other FETs to the OFF state. In this state, as in the state shown in FIG. 16, a closed circuit is made, starting from and returning to the #8 FET 94 by way of the #9 FET 96, the internal diode of the #6 FET 90, the diode 188 and the #2 upper coil 48-2. Thus, the #2 upper coil 48-2 is set to the flywheel state. Further, in the state shown in FIG. 20, a circuit is made from the ground terminal 78 to the line terminal 76 by way of the internal diode of the #6 FET 90, the diode 188, the #1 lower coil 54-1 and the internal diode of the #1 FET 80. Thus, when the counterelectromotive force of the #1 lower coil 54-1 is larger than the supply voltage V, a current flowing through the #1 lower coil 54-1 can be withdrawn to the power supply side as a regenerative energy as in the state shown in FIG. 16. However, as is different from the state shown in FIG. 16, the #1 lower coil 54-1 cannot be supplied with a current in the reverse direction even with the #1 FET 80 and the #6 FET 90 being set to the ON state since the diode 188 prevents a current from flowing from the #1 lower coil 54-1 side to the #6 FET 90 side. That is, in the state shown in FIG. 20, the #1 lower coil is set to the regenerative state whether the #1 FET 80 and the #6 FET 90 are set to the ON state or to the OFF state.

As described above, in the present embodiment, no solenoid coil of the #1 upper coil 48-1, the #1 lower coil 54-1, the #2 upper coil 48-2 and the #2 lower coil 54-2 can be supplied with the demagnetizing current $I_R$ in the reverse direction. However, in the above described states shown in FIG. 18 through FIG. 20, the currents flowing through these solenoid coils can be withdrawn to the power supply side as a regenerative energy by energizing these solenoid coils in the reverse direction. Therefore, the currents flowing through the solenoid coils can be reduced promptly by realizing the states in FIG. 18 through FIG. 20.

Figure 21:
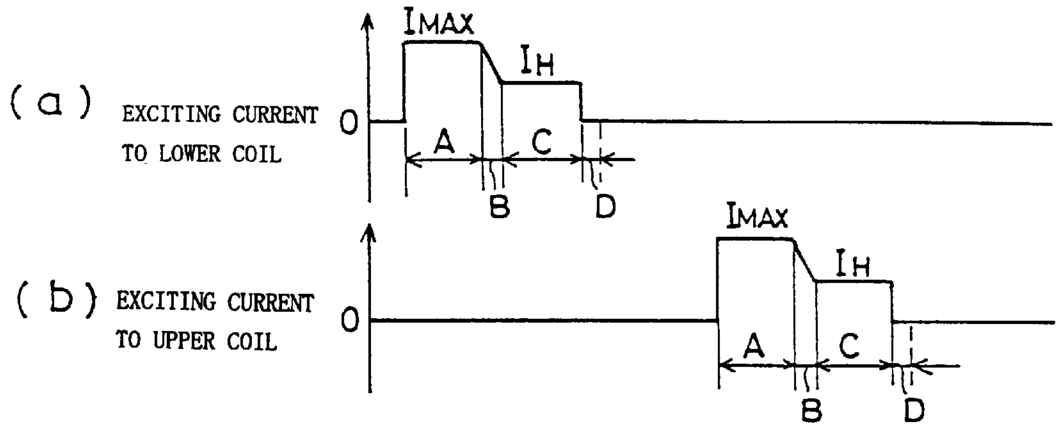
FIG. 21 is a diagram showing wave forms of exciting currents supplied to an upper coil and a lower coil when both of two solenoid valves are actuated so as to be opened and closed in the present embodiment.

FIG. 21 shows wave forms of the exciting currents supplied to the upper coil 48 and the lower coil 54 when the #1 solenoid valve 12-1 and the #2 solenoid valve 12-2 are actuated in synchronism with each other. The wave forms during Periods A, B and C shown in FIG. 21(*a*) can be realized, as in the case of the above described first embodiment, by properly switching the state corresponding to FIG. 4, the state corresponding to FIG. 5 or FIG. 6 and the state shown in FIG. 18. Further, the wave forms shown in FIG. 21(*b*) can be realized by properly switching a state wherein set to the ON state are the FETs which are disposed symmetrically in a vertical direction with the FETs set to the ON state in the state corresponding to FIG. 4 and in the state corresponding to FIG. 5 or FIG. 6, and the state shown in FIG. 18 (used in common for the upper coil 48 and the lower coil 54 as every FET is set to the OFF state in the state shown in FIG. 18).

As described above, however, as the solenoid coils cannot be supplied with the currents in the reverse direction in the present embodiment, the exciting current supplied to the upper coil 48, as shown in FIG. 21(*a*), never becomes negative during Period D, which is entered on after Period C, wherein the exciting current is held at a predetermined value $I_H$. However, by realizing the above described state shown in FIG. 18 during this Period D, the current flowing through the upper coil 48 can be withdrawn to the power supply side as a regenerative energy, which enables the exciting current to promptly be reduced to zero. Also during Period D with respect to the lower coil 54 shown in FIG. 21(*b*), the exciting current flowing through the lower coil 54 can promptly be reduced to zero by realizing the state shown in FIG. 18.

Figure 22:
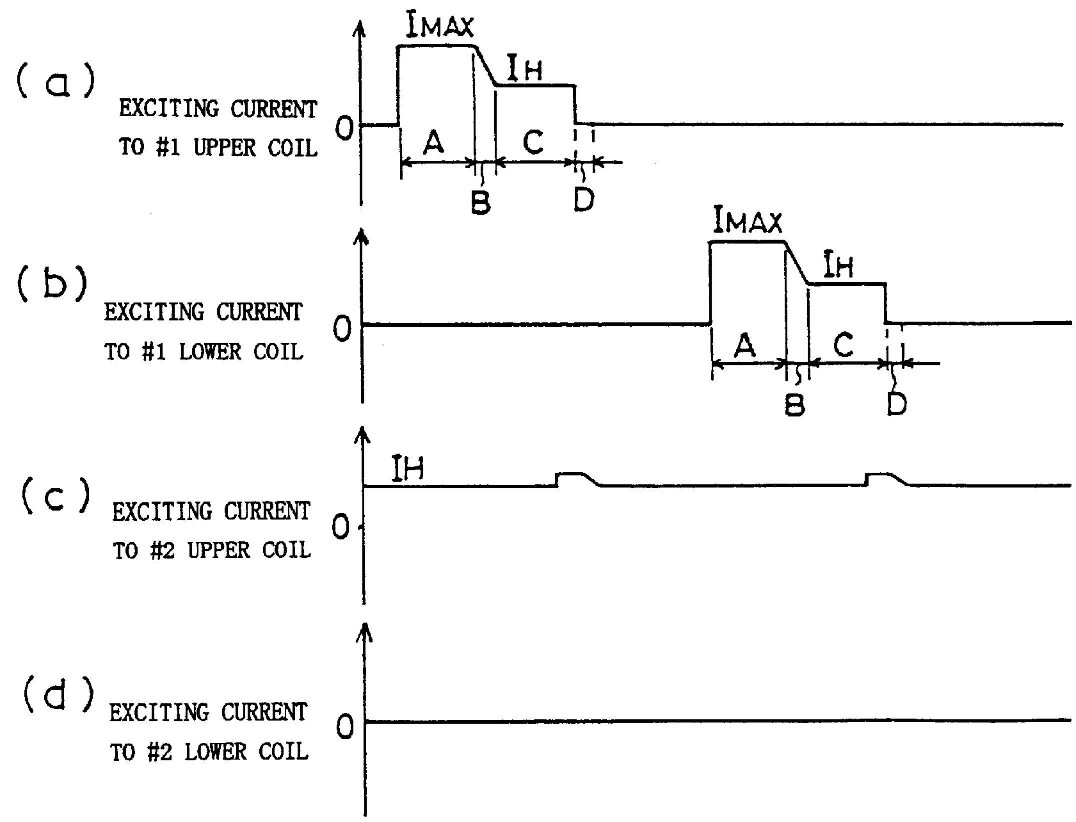
FIG. 22 is a diagram showing wave forms of exciting currents supplied to the #1 upper coil, the #1 lower coil, the #2 upper coil and a #2 lower coil when a #1 solenoid valve is actuated so as to be opened and closed and a #2 solenoid valve is maintained in the closed state.

FIG. 22 shows wave forms of the exciting currents supplied to the #1 upper coil 48-1, the #1 lower coil 54-1 and the #2 upper coil 48-2 when the #2 solenoid valve 12-2 is held in the closed state and only the #1 solenoid valve 12-1 is opened and closed. The wave forms can be realized by properly switching the states corresponding to FIG. 4, FIG. 5 or FIG. 6, FIG. 9, FIG. 10 and FIG. 12 through FIG. 15, respectively, the state shown in FIG. 19 corresponding to FIG. 11, and the state shown in FIG. 20 corresponding to FIG. 16. Also with respect to the wave forms shown in FIG. 22, the currents flowing through the upper coil 48-1 and the #1 lower coil 54-1 can promptly be reduced to zero by realizing the state shown in FIG. 19 or FIG. 20 during Period D, which is entered on after Period C. In this case, in the states shown in FIG. 19 and FIG. 20, the exciting current flowing through the #2 upper coil 48-2 is reduced during Period D because the #2 upper coil 48-2 is set to the flywheel state. Therefore, the exciting current supplied to the #2 upper coil 48-2 is increased by a predetermined amount relative to the holding current $I_H$ in expectation of the decrease just before Period D is entered on.

The #2 solenoid valve 12-2 can be held in the closed state and only the #1 solenoid valve 12-1 can be opened and closed by switching states wherein set to the ON state are the FETs disposed centrosymmetrically with the FETs which are set to the ON state in the above described states employed to realize the wave forms shown in FIG. 22.

As described above, according to the present embodiment, a current flowing through a solenoid coil can promptly be reduced to zero by realizing the states shown in FIG. 18 through FIG. 20 after an exciting current to the solenoid coil is cut off. Therefore, the electromagnetic attracting force exerted between a plunger 44 and the first electromagnet 46 or the second electromagnet 52 can be made to promptly vanish after the plunger 44 comes in contact with the first electromagnet 46 or the second electromagnet 52 although the effect is so much less, in comparison with the above described first embodiment, for the fact that the solenoid valve is not supplied with a current in the reverse direction.

The actuating circuit 174 of the present embodiment is realized by employing the relatively inexpensive diode 188 instead of the #5 FET 88 of the above described first embodiment. Therefore, in the present embodiment, it is possible to realize the solenoid valve control apparatus having the above described performance, attempting to further reduce the cost of the apparatus.

In the above described first and second embodiments, the descriptions have been made of the case wherein the two intake valves and the two exhaust valves are provided for each of the cylinders of the internal combustion engine, while the present invention is not limited to this case and can also be applied to an internal combustion engine having each of cylinders provided with two intake valves and one exhaust valve. In such a case, the number of the switching means for actuating the intake valves can be reduced by applying the above described structure only to the intake valves.

Further, in the above described first and second embodiments, the solenoid valves 12 which correspond to the intake valves or the exhaust valves provided for the same cylinder are actuated by the same actuating circuits 74 and 174. However, as described above, it is also practicable that only one of the #1 solenoid valve 12-1 and the #2 solenoid valve 12-2 is actuated so as to be opened and closed while the other is held closed by means of the same actuating circuits 74 and 174. Therefore, two valves of which opening periods do not overlap with each other, for example, one intake valve (or exhaust valve) of a first cylinder and one intake valve (or exhaust valve) of a fourth cylinder, or one intake valve (or exhaust valve) of a second cylinder and one intake valve (or exhaust valve) of a third cylinder in an four-cylinder internal combustion engine, may be actuated by the same actuating circuits 74 and 174.

In the above described first and second embodiments, the #1 FET 80 through the #9 FET 96, the line terminal 76 and the ground terminal 78 correspond to the switching means described in claims, a first line terminal described in claims and a second line terminal described in claims, respectively.

The present invention is not limited to the specifically disclosed embodiments, and variations and modifications may be made without departing from scope of the present invention.

What is claimed is:

1. In a solenoid valve actuating apparatus for actuating a plurality of engine valves, for each of which provided are a first electromagnet to actuate said engine valve in a first predetermined direction and a second electromagnet to actuate said engine valve in a second predetermined direction, by means of said first and second electromagnets so that a plurality of said engine valves will be opened and closed, said solenoid valve actuating apparatus characterized in that:

two of said engine valves form one engine valve group and an actuating circuit is provided for each of said engine valve groups;

said actuating circuit comprises three series circuits each comprising three switching means connected in series between a first line terminal on a high voltage side and a second line terminal on a low voltage side; and four of the electromagnets corresponding to each of the engine valve groups connect connecting-in-series portions between said switching means between different series circuits.

2. The solenoid valve actuating apparatus as claimed in claim 1, characterized in that:

said actuating circuit comprising a first through third series circuits having a first through third switching means connected in series in order from said first line terminal side between said first line terminal and said second line terminal; and said four electromagnets are connected between a connecting portion of the first and the second switching means of said first series circuit and a connecting portion of the first and the second switching means of said second series circuit, between a connecting portion of the second and the third switching means of said first series circuit and a connecting portion of the second and the third switching means of said second series circuit, between the connecting portion of the first and the second switching means of said second series circuit and a connecting portion of the first and the second switching means of said third series circuit, and between the connecting portion of the second and the third switching means of said second series circuit and a connecting portion of the second and the third switching means of said third series circuit, respectively.

3. The solenoid valve actuating apparatus as claimed in claim 2, characterized in that:

the first electromagnet corresponding to one engine valve of each of the engine valve groups is connected between the connecting portion of the first and the second switching means of said first series circuit and the connecting portion of the first and the second switching means of said second series circuit, and the second electromagnet corresponding to said one engine valve is connected between the connecting portion of the second and the third switching means of said first series circuit and the connecting portion of the second and the third switching means of said second series circuit; and the first electromagnet corresponding to another engine valve is connected between the connecting portion of the second and the third switching means of said second series circuit and the connecting portion of the second and the third switching means of said third series circuit, and the second electromagnet corresponding to said other engine valve is connected between the connecting portion of the first and the second switching means of said second series circuit and the connecting portion of the first and the second switching means of said third series circuit.

4. The solenoid valve actuating apparatus as claimed in claim 1, characterized in that each of said switching means includes a switching element turning on and off and a diode disposed in parallel with said switching element so as to allow a current to flow from said second line terminal side to said first line terminal side.

5. The solenoid valve actuating apparatus as claimed in claim 1, characterized in supplying each of said electromagnets with an exciting current having a predetermined wave form by switching combinations of an ON state and an OFF state of said switching means.

6. The solenoid valve actuating apparatus as claimed in claim 5, characterized in that said predetermined wave form comprises a wave form portion of a positive current in a predetermined positive direction and a wave form portion of a reverse current in a reverse direction to said positive direction.

7. In a solenoid valve actuating apparatus for actuating a plurality of engine valves, for each of which provided are a first electromagnet to actuate said engine valve in a first predetermined direction and a second electromagnet to actuate said engine valve in a second predetermined direction, by means of said first and second electromagnets so that a plurality of said engine valves will be opened and closed, said solenoid valve actuating apparatus characterized in that:

two of said engine valves form one engine valve group and an actuating circuit is provided for each of said engine valve groups;

said actuating circuit comprises:

a first and a second series circuits each comprising three switching means connected in series between a first line terminal on a high voltage side and a second line terminal on a low voltage side; and a third series circuit wherein two of the switching means and one diode disposed so as to allow a current flow from said second line terminal side to said first terminal side are connected in series between said first line terminal and said second line terminal so that said diode will be disposed in a center; and four of the electromagnets corresponding to each of the engine valve groups are connected between connecting portions of the switching means and the diode of said third series circuit and connecting portions between the switching means of said first or second series circuit.

8. The solenoid valve actuating apparatus as claimed in claim 7, characterized in that:

each of said first and second series circuits comprises a first through third switching means connected in series in order from said first line terminal side between said first line terminal and said second line terminal, and said third series circuit comprises a first switching means, the diode provided so as to allow the current flow from said second line terminal side to said first terminal side and a second switching means connected in series in order from the first line terminal side between the first line terminal and the second line terminal; and said four electromagnets are connected between a connecting portion of the first and the second switching means of said first series circuit and a connecting portion of the first switching means and the diode of said third series circuit, between a connecting portion of the second and the third switching means of said first series circuit and a connecting portion of the diode and the second switching means of said third series circuit, between a connecting portion of the first and the second switching means of said second series circuit and the connecting portion of the first switching means and the diode of said third series circuit, and between a connecting portion of the second and the third switching means of said second series circuit and the connecting portion of the diode and the second switching means of said third series circuit, respectively.

9. The solenoid valve actuating apparatus as claimed in claim 8, characterized in that:

the first electromagnet corresponding to one engine valve of each of the engine valve groups is connected between the connecting portion of the first and the second switching means of said first series circuit and the connecting portion of the first switching means and the diode of said third series circuit, and the second electromagnet corresponding to said one engine valve is connected between the connecting portion of the second and the third switching means of said first series circuit and the connecting portion of the second switching means and the diode of said third series circuit; and the first electromagnet corresponding to another engine valve is connected between the connecting portion of the second and the third switching means of said second series circuit and the connecting portion of the second switching means and the diode of said third series circuit, and the second electromagnet corresponding to said other engine valve is connected between the connecting portion of the first and the second switching means of said second series circuit and the connecting portion of the first switching means and the diode of said third series circuit.

10. The solenoid valve actuating apparatus as claimed in claim 7, characterized in that each of said switching means includes a switching element turning on and off and a diode disposed in parallel with said switching element so as to allow a current to flow from said second line terminal side to said first line terminal side.

11. The solenoid valve actuating apparatus as claimed in claim 7, characterized in supplying each of said electromagnets with an exciting current having a predetermined wave form by switching combinations of an ON state and an OFF state of said switching means.

* * * * *